(12) United States Patent
Tani

(10) Patent No.: US 6,195,331 B1
(45) Date of Patent: Feb. 27, 2001

(54) METHOD OF MANAGING TRANSMISSION BUFFER MEMORY AND ATM COMMUNICATION DEVICE USING THE METHOD

(75) Inventor: Akihiko Tani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/989,686

(22) Filed: Dec. 12, 1997

(30) Foreign Application Priority Data

Jan. 10, 1997 (JP) .................................................. 9-003142
Sep. 18, 1997 (JP) .................................................. 9-253812

(51) Int. Cl.$^7$ .................................................. G01R 31/08
(52) U.S. Cl. ......................... 370/230; 370/252; 370/395; 370/412; 370/429
(58) Field of Search .................................... 370/395–400, 370/409, 412, 415, 419, 420, 428, 429, 465, 474, 463, 230–234, 252; 711/147–153

(56) References Cited

U.S. PATENT DOCUMENTS

| 5,675,573 | * | 10/1997 | Karol et al. | 370/230 |
| 5,757,771 | * | 5/1998 | Li et al. | 370/235 |
| 5,862,126 | * | 1/1999 | Shah et al. | 370/230 |
| 5,889,762 | * | 3/1999 | Pajuvirta et al. | 370/230 |
| 5,923,656 | * | 7/1999 | Duan et al. | 370/395 |
| 5,930,477 | * | 7/1999 | Uchida | 370/395 |
| 5,956,342 | * | 9/1999 | Manning et al. | 370/414 |
| 5,959,993 | * | 9/1999 | Varma et al. | 370/397 |

OTHER PUBLICATIONS

"SARA Chipsett Technical Manual" TranSwitch Corp., Edition 5, Dec. 1994, Preliminary i–vii, and 2–2, 2–3.

* cited by examiner

Primary Examiner—Seema S. Rao
(74) Attorney, Agent, or Firm—Sughrue, Mion, Zinn, Macpeak & Seas, PLLC

(57) ABSTRACT

An asynchronous transfer mode (ATM) terminal includes an ATM communication device comprising a plurality of data transmission request units each for establishing a logical connection between the ATM terminal and another ATM terminal on an ATM network, and for sending a data by way of the connection, a data transmission unit for segmenting a data to be transmitted from the buffer memory into a plurality of fixed-length cells and for sending the plurality of cells cell by cell, a connection management unit for managing and providing management information about a plurality of logical connections each of which is to be used when a corresponding one of the plurality of data transmission units sends a data by way of each of the plurality of logical connections, and a buffer memory management unit for dividing a buffer memory for temporarily storing a data to be transmitted from each of the plurality of data transmission request units into a plurality of memory areas, and for assigning each of the plurality of memory areas to at least one of the plurality of data transmission request unit, the buffer memory management unit releasing each of the plurality of memory areas of the buffer memory assigned to at least one of the plurality of data transmission request units at the completion of data transmission by each of the plurality of data transmission request units.

18 Claims, 15 Drawing Sheets

FIG.7

| CONNECTION | GROUP ID |
|---|---|
| 1 | 1 |
| 2 | 2 |
| 3 | 2 |
| ⋮ | ⋮ |
| N-1 | M |
| N | M |

TBL1

FIG.9

| CONNECTION | TRAFFIC CLASS | GROUP ID |
|---|---|---|
| 1 | CBR | 1 |
| 2 | CBR | 2 |
| 3 | ABR | K |
| 4 | CBR | 3 |
| 5 | ABR | K |
| 6 | ABR | K |
| ⋮ | ⋮ | ⋮ |
| N-2 | VBR | M-1 |
| N-1 | ABR | K |
| N | CBR | M |

TBL2

FIG.11

| CONNECTION | TRAFFIC CLASS | GROUP ID | PRIORITY |
|---|---|---|---|
| 1 | CBR | 1 | - |
| 2 | CBR | 2 | - |
| 3 | ABR | K | LOW |
| 4 | CBR | 3 | - |
| 5 | ABR | K | LOW |
| 6 | ABR | K | HIGH |
| ⋮ | ⋮ | ⋮ | ⋮ |
| N-2 | VBR | M-1 | - |
| N-1 | ABR | K | HIGH |
| N | CBR | M | - |

TBL3

METHOD OF MANAGING TRANSMISSION BUFFER MEMORY AND ATM COMMUNICATION DEVICE USING THE METHOD

BACKGROUND OF THE INVENTION

1. Field of the Invention

The present invention relates to a method of managing a transmission buffer memory for use in asynchronous transfer mode (ATM) communications and, more particularly, to an ATM communication device for carrying out ATM communications by using the transmission buffer memory management method.

2. Description of the Prior Art

Referring now to FIG. 16, there is illustrated a block diagram showing a prior art method of managing a transmission buffer memory within an ATM terminal as disclosed in "SARA Chipset Technical Manual" by TranSwitch, Corp. which describes SARA chipset devices which are LSI circuits for segmenting a packet into ATM cells. In the figure, reference numeral 1 denotes an LSI for segmenting a data to be transmitted into a plurality of ATM cells and for sending out the plurality of ATM cells, 2 denotes a control memory for storing various pieces of control information which is referred to when the LSI 1 sends out the plurality of ATM cells, and 3 denotes a buffer memory for storing a data to be transmitted.

In operation, when a data transmission request source makes a request for data transmission by way of a connection, which is one of connectable communication paths which has been established between the ATM terminal and the destination, a data to be transmitted is transferred to the buffer memory 3 which is also referred to as the transmission buffer memory. An address specifying a memory location of the buffer memory 3 where the data to be transmitted is stored, the traffic class of the connection through which the data is to be transmitted, traffic parameters, and so on are then prepared in the control memory 2, and the LSI 1 is initiated so that it starts to send out the data. As a result, the LSI 1 reads the data to be transmitted from the buffer memory 3 by referring to the address specifying the memory location prepared in the control memory 2, and then segments the data to be transmitted into a plurality of ATM cells according to the various kinds of parameters. The LSI 1 then starts to send out each of the ATM cells on an ATM network. At the completion of segmenting the data to be transmitted which is stored in the buffer memory 3 and sending out the data by way of the ATM network, an area of the buffer memory 3 in which the data has been stored is released. If another request for data transmission by way of another connection is made before the completion of the above data transmission, another data to be transmitted which is associated with the other data transmission request is transferred to a free area of the buffer memory 3, and another address specifying a memory location of the buffer memory 3 where the other data to be transmitted is stored, the traffic class of the second connection through which the other data is to be transmitted, traffic parameters, and so on are also prepared in the control memory 2. The LSI 1 is then initiated so that it starts to send out the other data on the ATM network. The LSI 1 segments the other data to be transmitted through the second connection into a plurality of ATM cells, and then multiplexes the first plurality of ATM cells to be transmitted via the first connection and the second plurality of ATM cells to be transmitted via the second connection and then sends out these ATM cells on the ATM network cell by cell.

In the prior art transmission buffer memory management method, when a number of requests for data transmission by way of an identical connection are generated, the buffer memory 3 of the ATM terminal can be occupied by a number of data to be transmitted which have been transferred thereto according to the requests. As a result, the buffer memory 3 has no sufficient free area for another data to be transmitted to be stored when another request for data transmission by way of another connection is made. This thus makes it impossible for the ATM terminal using the prior art method to send out another data by way of another connection even though there is a free space in the band of the ATM network.

Furthermore, there is a case where the buffer memory 3 is not occupied by a number of data to be transmitted by way of an identical connection, but there is no sufficient free area in the buffer memory 3 for a request for data transmission by way of another logical connection. In such a case, the ATM terminal cannot send out another data to be transmitted on the ATM network, like the above case.

SUMMARY OF THE INVENTION

The present invention is made to overcome the problems. It is therefore an object of the present invention to provide a method of managing a transmission buffer memory, capable of preventing the transmission buffer memory from being occupied by a request for data transmission by way of a logical connection and hence avoiding bringing about a state wherein data transmission by way of another logical connection is enabled, thereby realizing efficient use of the transmission buffer memory, and an ATM communication device using the method.

It is a further object of the present invention to provide a method of managing a transmission buffer memory, capable of avoiding bringing about a state wherein transmission of a data the size of which exceeds the size of the transmission buffer memory is enabled, thereby realizing efficient use of the transmission buffer memory, and an ATM communication device using the method.

It is another object of the present invention to provide a method of managing a transmission buffer memory so as to ensure the communication quality of logical connections according to the types of the logical connections, thereby realizing efficient use of the transmission buffer memory, and an ATM communication device using the method.

It is an additional object of the present invention to provide a transmission buffer memory management method of grouping a plurality of logical connections and managing a buffer memory so as to ensure the communication quality of logical connections according to the types of the logical connections, thereby realizing efficient use of the transmission buffer memory, and an ATM communication device using the method.

It is a further object of the present invention to provide a transmission buffer memory management method capable of, according to priorities assigned to a plurality of connections grouped into an identical group, performing data transmission by way of a connection with the higher priority included the group with efficiency, and an ATM communication device using the method.

It is another object of the present invention to provide a transmission buffer memory management method capable of reducing the rate of abandonment of transmission of a message which is constructed of a plurality of data to be transmitted and which is handled by a host application program, and an ATM communication device using the method.

It is a further object of the present invention to provide a transmission buffer memory management method capable of ensuring data transmission by way of a logical connection with the lower priority, and an ATM communication device using the method.

In accordance with one aspect of the present invention, there is provided a method of managing a transmission buffer memory disposed in an asynchronous transfer mode (ATM) terminal connected to an ATM network for transmitting and receiving data by way of the ATM network, comprising the steps of: dividing the transmission buffer memory into a plurality of memory areas each for temporarily storing a data to be transmitted associated with a request for data transmission; according to information about a plurality of logical connections established between the ATM terminal and other ATM terminals, assigning each of the plurality of memory areas to at least a transmission request source which uses a corresponding one of the plurality of logical connections; in response to a request for data transmission from a transmission request source, determining if there is sufficient free space for a data to be transmitted to be stored in a corresponding memory area of the transmission buffer memory which is assigned to the transmission request source; and controlling transfer of the data to be transmitted which is associated with the above data transmission request to the corresponding memory area according to a determination result obtained by the above determining step.

The controlling step can include transferring the data to be transmitted which is associated with the data transmission request to the corresponding memory area in order to transmit the data to another ATM terminal on the ATM network, when it is determined, in the determining step, that there is sufficient free space for a data to be transmitted to be stored in the corresponding memory area of the transmission buffer memory, and refusing the request for data transmission and then waiting for another request for data transmission, when it is determined, in the determining step, that there is no sufficient free space for the data to be transmitted to be stored in the corresponding memory area of the transmission buffer memory.

In accordance with a preferred embodiment of the present invention, the method further comprises the step of obtaining the number of the plurality of logical connections each of which is used by a corresponding transmission request source when it sends a data to another ATM terminal on the ATM network. Furthermore, the dividing step includes dividing the transmission buffer memory into a plurality of memory areas each for temporarily storing a data to be transmitted which is associated with a request for data transmission by the number of the plurality of logical connections obtained in the obtaining step, and the assigning step includes assigning the plurality of memory areas to the respective transmission request sources each for making a request to send a data.

Preferably, the dividing step includes equally dividing the transmission buffer memory into a plurality of memory areas by the number of the plurality of logical connections.

In accordance with another preferred embodiment of the present invention, the assigning step further includes informing each of the plurality of transmission request sources of the storage capacity of the corresponding memory area which is assigned to each of the plurality of transmission request sources.

In accordance with another preferred embodiment of the present invention, the method further comprising the step of grouping the plurality of logical connections each of which is used by a corresponding transmission request source when it sends a data to another ATM terminal on the ATM network into a plurality of groups. Furthermore, the dividing step includes equally dividing the transmission buffer memory into a plurality of memory areas by the number of the plurality of groups obtained in the grouping step, and the assigning step includes assigning the plurality of memory areas to the plurality of groups, respectively.

Preferably, the grouping step includes grouping the plurality of logical connections into a plurality of groups according to their group identification numbers each of which has been added to setting parameters which define each of the plurality of logical connections which is used by a corresponding transmission request source when it sends a data. The method further generates a group management table including information about the grouping of the plurality of logical connections performed in the grouping step. The group management table can include information showing a correspondence between the plurality of logical connections each of which is used by a corresponding transmission request source when it sends a data and the plurality of group identification numbers each of which has been added to setting parameters which define each of the plurality of logical connections.

Alternatively, the grouping step can include giving each of the plurality of logical connections a group identification number according to the traffic class of each of the plurality of logical connections, and grouping the plurality of logical connections into a plurality of groups according to their group identification numbers given. The method further generates a group management table including information about the grouping of the plurality of logical connections performed in the grouping step. The group management table can include information showing a correspondence between the plurality of logical connections each of which is used by a corresponding transmission request source when it sends out a data and the plurality of group identification numbers each of which has been given to at least one of the plurality of logical connections according to the traffic class of at least one of the plurality of logical connections.

In accordance with another preferred embodiment of the present invention, the grouping step can include automatically giving each of the plurality of logical connections a group identification number according to the traffic class of each of the plurality of logical connections, such as constant bit rate (CBR), variable bit rate (VBR), or available bit rate (ABR), and automatically grouping the plurality of logical connections into a plurality of groups according to their group identification numbers given. Preferably, the grouping step further includes giving a plurality of logical connections with the traffic class of ABR an identical group identification number and therefore grouping the plurality of logical connections into one group, and assigning priorities to the plurality of logical connections which belong to the same group. The group management table can include information showing a correspondence of the plurality of logical connections each of which is used by a corresponding transmission request source when it sends out a data, the plurality of group identification numbers each of which has been given to at least one of the plurality of logical connections according to the traffic class of at least one of the plurality of logical connections such as CBR, VBR, and ABR, and the priorities which have been assigned to the plural logical connections with the traffic class of ABR and grouped into the same group. Furthermore, the controlling step includes controlling transfer of a data to be transmitted which is associated with a request for data transmission from a transmission request source to a corresponding memory area according to a determination result obtained by the determining step and the group management table.

In accordance with another preferred embodiment of the present invention, when a request for data transmission via one logical connection with the traffic class of ABR grouped into the same group is made, a data to be transmitted associated with the current data transmission request is transferred to a corresponding memory area which it is assigned to the plurality of logical connections included in the same group, in the controlling step, if it is determined, in the determining step, there is sufficient free space for the data to be transmitted to be stored in the corresponding memory area. On the contrary, when it is determined, in the determining step, there is no sufficient free space for the data to be transmitted to be stored in the corresponding memory area, the priority assigned to the logical connection which is to be used by the above data transmission request is compared with the priority assigned to another logical connection which is being used by a previous data transmission request being processed now and the data to be transmitted associated with the above current data transmission request is then transferred to the corresponding memory area and is overwritten over another data to be transmitted associated with the previous data transmission request being processed now if the priority assigned to the logical connection associated with the current transmission request is higher than that assigned to the other logical connection associated with the previous transmission request being processed now, and the current data transmission request is refused and another request for data transmission is waited for if the priority assigned to the logical connection associated with the current data transmission request is lower than or equal to that assigned to the other logical connection associated with the previous data transmission request being processed now.

In accordance with another preferred embodiment of the present invention, when a request for data transmission via one logical connection with the traffic class of ABR grouped into the same group is made, a data to be transmitted associated with the current data transmission request is transferred to a corresponding memory area which is assigned to the plurality of logical connections included in the same group, in the controlling step, if it is determined, in the determining step, there is sufficient free space for the data to be transmitted to be stored in the corresponding memory area. On the contrary, when it is determined, in the determining step, there is no sufficient free space for the data to be transmitted to be stored in the corresponding memory area, the priority assigned to the logical connection associated with the above current data transmission request is compared with the priority assigned to another logical connection associated with a previous data transmission request being processed now and the data to be transmitted associated with the above current data transmission request is then transferred to the corresponding memory area and is overwritten over another data to be transmitted associated with the previous data transmission request being processed now, and transmission of the data to be transmitted associated with the current data transmission request is started, if the priority assigned to the logical connection associated with the current data transmission request is higher than that assigned to the other logical connection associated with the previous data transmission request being processed now and if a data to be transmitted from one transmission request source which made the previous data transmission request has been replaced by another data during the data transmission, and the current data transmission request is refused and another request for data transmission is waited for if the priority assigned to the logical connection associated with the current data transmission request is lower than or equal to that assigned to the other logical connection associated with the previous data transmission request being processed now.

In accordance with another preferred embodiment of the present invention, the method further comprises the step of, when the data to be transmitted associated with the current data transmission request is overwritten over another data to be transmitted associated with the previous data transmission request being processed now, informing the corresponding transmission request source which made the previous data transmission request of the amount of data which has not been sent out included in the other data over which the data to be transmitted associated with the current data transmission request is overwritten.

In accordance with another aspect of the present invention, there is provided an ATM communication device disposed in an ATM terminal, comprising: a plurality of data transmission request units each for establishing a logical connection between the ATM terminal and another ATM terminal on an ATM network, and for sending a data by way of the logical connection; a buffer memory for temporarily storing a data to be transmitted from each of the plurality of data transmission request units; a data transmission unit for segmenting a data to be transmitted from the transmission buffer memory into a plurality of fixed-length cells and for sending out the plurality of cells on the ATM network cell by cell; a connection management unit for managing and providing management information about a plurality of logical connections each of which is to be used by a corresponding one of the plurality of data transmission request units when it sends a data by way of each of the plurality of logical connections; and a buffer memory management unit for dividing the transmission buffer memory into a plurality of memory areas, and for assigning each of the plurality of memory areas to at least one of the plurality of data transmission request units, the buffer memory management unit releasing each of the plurality of memory areas of the transmission buffer memory assigned to at least one of the plurality of data transmission request units at the completion of transmission of a data from the one data transmission request unit by the data transmission unit.

According to the management information about the plurality of logical connections established between the ATM terminal and other ATM terminals on the ATM network from the connection management unit, the buffer memory management unit can assign each of the plurality of memory areas to at least one of the plurality of data transmission request units.

In accordance with a preferred embodiment of the present invention, when the buffer memory management units receives a request for data transmission from one of the plurality of data transmission request units, the buffer memory management unit transfers a data to be transmitted which is associated with the request for data transmission to a corresponding memory area of the transmission buffer memory assigned to the one data transmission request unit in order to transmit the data to another ATM terminal on the ATM network and then releases the memory area at the completion of the data transmission if the buffer memory management unit determines that there is sufficient free space for a data to be transmitted to be stored in the memory area of the transmission buffer memory, or the buffer memory management unit refuses the request for data transmission and then waits for another request for data transmission if the buffer memory management unit determines that there is no sufficient free space for the data to be transmitted to be stored in the memory area.

In accordance with another preferred embodiment, the buffer memory management unit can equally divide the transmission buffer memory into a plurality of memory areas by the number of the plurality of logical connections through each of which a corresponding one of the plurality of data transmission request units can send a data, and then assigns the plurality of memory areas of the transmission buffer memory to the plurality of data transmission request units, respectively. Furthermore, when the data transmission unit completes transmission of a data from each of the plurality of data transmission request units, the buffer memory management unit releases a corresponding memory area of the transmission buffer memory.

In accordance with another preferred embodiment of the present invention, the buffer memory management unit informs each of the plurality of data transmission request units of the storage capacity of a corresponding memory area which is assigned to each of the plurality of data transmission request units.

In accordance with another preferred embodiment of the present invention, the buffer memory management unit groups the plurality of logical connections each of which is used by a corresponding one of the plurality of data transmission request units when it sends a data to another ATM terminal on the ATM network into a plurality of groups, and then equally divides the transmission buffer memory into a plurality of memory areas by the number of the plurality of groups and further assigns the plurality of memory areas to the plurality of groups, respectively.

Preferably, the buffer memory management unit groups the plurality of logical connections into a plurality of groups according to their group identification numbers each of which has been added to setting parameters which define each of the plurality of logical connections which is used by a corresponding one of the plurality of data transmission request units when it sends a data to another ATM terminal on the ATM network. The buffer memory management unit then generates a group management table including information about the grouping of the plurality of logical connections. The group management table can include information showing a correspondence between the plurality of logical connections each of which is used by a corresponding one of the plurality of data transmission request units when it sends a data to another ATM terminal on the ATM network and the plurality of group identification numbers each of which has been added to at least one of the plurality of logical connections. Furthermore, the buffer memory management unit groups the plurality of logical connections into the plurality of groups according to the group management table.

Alternatively, the buffer memory management unit gives each of the plurality of logical connections a group identification number according to traffic class of each of the plurality of logical connections. The buffer memory management unit then groups the plurality of logical connections into a plurality of groups according to their group identification numbers given and generates a group management table including information about the grouping of the plurality of logical connections. The group management table can include information showing a correspondence between the plurality of logical connections each of which is used by a corresponding one of the plurality of data transmission request units when it sends a data to another ATM terminal on the ATM network and the plurality of group identification numbers each of which has been added to at least one of the plurality of logical connections according to the traffic class of at least the one of the plurality of logical connections. Furthermore, the buffer memory management unit groups the plurality of logical connections into a plurality of groups according to the group management table.

In accordance with another preferred embodiment of the present invention, the buffer memory management unit gives each of the plurality of logical connections a group identification number according to the traffic class of each of the plurality of logical connections, such as constant bit rate (CBR), variable bit rate (VBR), or available bit rate (ABR), and then automatically groups the plurality of logical connections according to their group identification numbers given.

Preferably, the buffer memory management unit can give a plurality of logical connections with the traffic class of ABR an identical group identification number, and the buffer memory management unit then groups the plurality of logical connections with the same group identification number into one group and assigns priorities to the plurality of logical connections which belong to the same group. The group management table can include information showing a correspondence of the plurality of logical connections each of which is used by a corresponding one of the plurality of data transmission request units when it sends a data to another ATM terminal on the ATM network, the plurality of group identification numbers each of which has been given to at least one of the plurality of logical connections according to the traffic class of at least the one of the plurality of logical connections, such as CBR, VBR, and ABR, and the priorities which have been assigned to the plurality of logical connections with the traffic class of ABR and grouped into the same group. Furthermore, the buffer memory management unit groups all the logical connections into a plurality of groups according to the group management table.

In accordance with another preferred embodiment of the present invention, when the buffer memory management unit receives a request for data transmission via one logical connection with the traffic class of ABR grouped into the same group, the buffer memory management unit transfers a data to be transmitted associated with the data transmission request to a corresponding memory area which is assigned to the logical connection which belongs to the same group if there is sufficient free space for the data to be transmitted to be stored in the corresponding memory area. On the contrary, when there is no sufficient free space for the data to be transmitted to be stored in the corresponding memory area, the buffer memory management unit compares the priority assigned to the logical connection which is to be used by the above current data transmission request with the priority assigned to another logical connection which is being used by a previous data transmission request being processed now and then transfers the data to be transmitted associated with the above current transmission request to the corresponding memory area and overwrites the data to be transmitted on another data to be transmitted associated with the previous data transmission request being processed now if the priority assigned to the logical connection associated with the current transmission request is higher than that assigned to the other logical connection associated with the previous transmission request being processed now, or the buffer memory management unit refuses the current data transmission request and waits for another request for data transmission if the priority assigned to the logical connection associated with the current transmission request is lower than or equal to that assigned to the other logical connection associated with the previous transmission request being processed now.

In accordance with another preferred embodiment of the present invention, when the buffer memory management unit receives a request for data transmission via one logical connection with the traffic class of ABR grouped into the same group, the buffer memory management unit transfers a data to be transmitted associated with the current transmission request to a corresponding memory area which is assigned to the plurality of logical connections included in the same group if there is sufficient free space for the data to be transmitted to be stored in the corresponding memory area. On the contrary, when there is no sufficient free space for the data to be transmitted to be stored in the corresponding memory area, the buffer memory management unit compares the priority assigned to the logical connection associated with the above current data transmission request with the priority assigned to another logical connection associated with a previous transmission request being processed now and then transfers the data to be transmitted associated with the above current data transmission request to the corresponding memory area and overwrites the data to be transmitted over another data to be transmitted associated with the previous data transmission request being processed now if the priority assigned to the logical connection associated with the current transmission request is higher than that assigned to the other logical connection associated with the previous transmission request being processed now and if a data to be transmitted from the same data transmission request unit which made the previous data transmission request has been replaced by another data, or the buffer memory management unit refuses the current data transmission request and then waits for another request for data transmission if the priority assigned to the logical connection associated with the current transmission request is lower than or equal to that assigned to the other logical connection associated with the previous data transmission request being processed now.

In accordance with another preferred embodiment of the present invention, when the data to be transmitted associated with the current data transmission request is overwritten over another data to be transmitted associated with the previous data transmission request being processed now, the buffer memory management unit informs the corresponding data transmission request unit which made the previous data transmission request of the amount of data which has not been sent out included in the other data over which the data to be transmitted associated with the current data transmission request is overwritten.

Further objects and advantages of the present invention will be apparent from the following description of the preferred embodiments of the invention as illustrated in the accompanying drawings.

BRIEF DESCRIPTION OF THE DRAWINGS

FIG. 7 is a view showing a group management table of the ATM communication device using the transmission buffer memory management method according to the third embodiment of the present invention;

FIG. 9 is a view showing a group management table of the ATM communication device using the transmission buffer memory management method according to the fourth embodiment of the present invention;

FIG. 11 is a view showing a group management table of the ATM communication device using the transmission buffer memory management method according to the fifth embodiment of the present invention;

DETAILED DESCRIPTION OF THE PREFERRED EMBODIMENTS

First Embodiment

Figure 1:
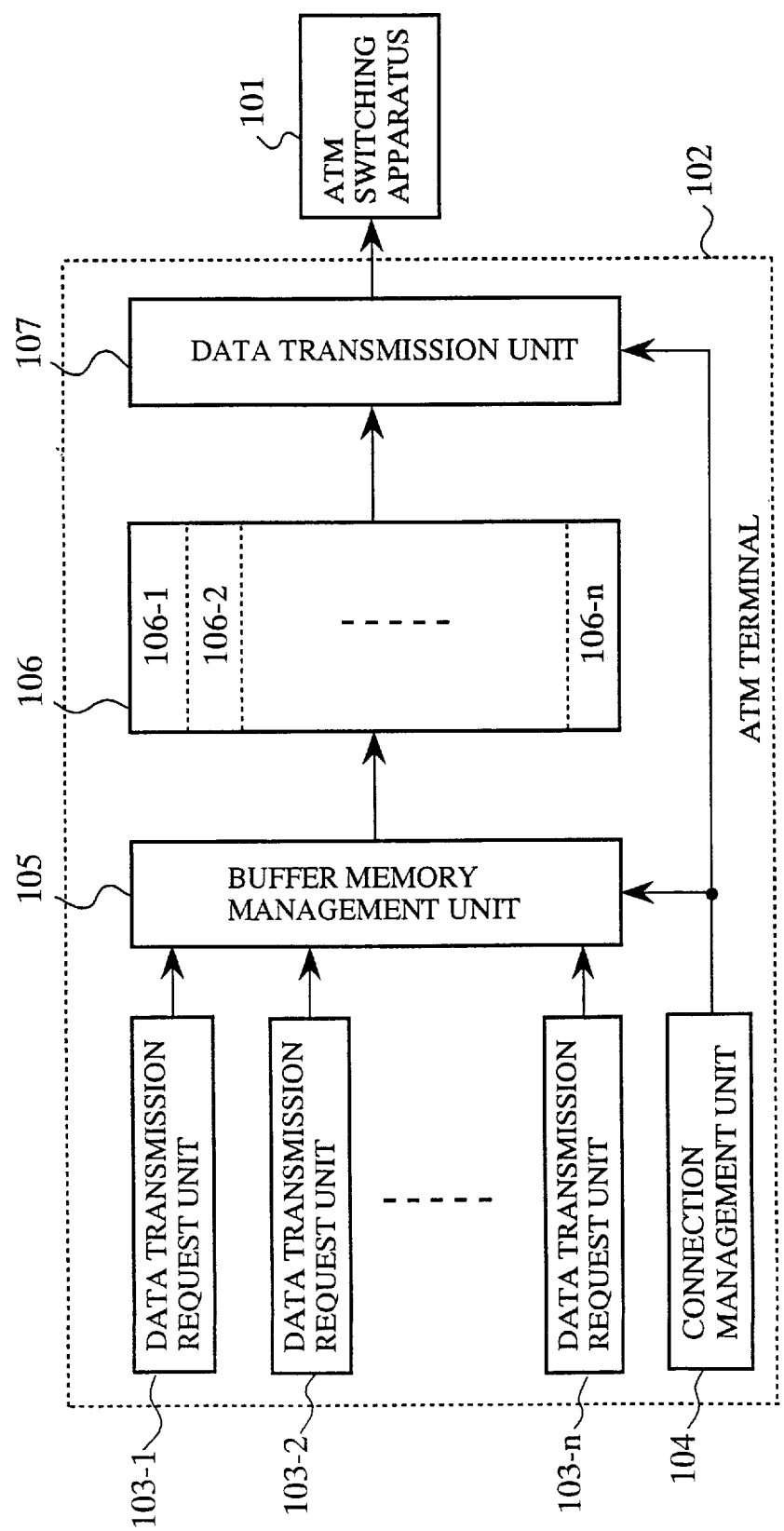
FIG. 1 is a block diagram showing the structure of an ATM communication device using a transmission buffer memory management method according to a first embodiment of the present invention.

Referring now to FIG. 1, there is illustrated a block diagram showing the structure of an ATM communication device using a transmission buffer memory management method according to a first embodiment of the present invention. In the figure, reference numeral 101 denotes an ATM switching apparatus for performing a switching operation on each ATM cell received so as to send each ATM cell to a destination ATM terminal device which has been designated in an ATM network according to the contents of the header of each ATM cell, 102 denotes an ATM terminal device which can send or receive ATM cells, and 103-1 through 103-n each denotes a data transmission request unit for establishing a logical connection between the ATM terminal device 102 and another ATM terminal device and for sending a data to the other ATM terminal by way of the logical connection. Thus the ATM terminal 102 can establish N logical connections between the ATM terminal and other ATM terminals by using the plurality of data transmission request units 103-1 through 103-n. Furthermore, reference numeral 106 denotes a buffer memory (or transmission buffer memory) for temporarily storing a data to be transmitted from each of the plurality of data transmission request units 103-1 through 103-n, 104 denotes a connection management unit for managing each of the plurality of logical connections which is to be used by each of the plurality of data transmission request units 103-1 through 103-n when each of the plurality of data transmission request units 103-1 sends out a data by way of each of the plurality of logical connections, 105 denotes a buffer memory management unit for equally dividing the buffer memory 106 into a plurality of memory areas by the number of the plurality of logical connections which are managed by the connection management unit 104, and for assigning the plurality of memory areas of the buffer memory to the respective data transmission request units 103-1 through 103-n, and 107 denotes a data transmission unit for connecting the ATM terminal 102 to the ATM switching apparatus 101, and for reading and then segmenting a data to be transmitted from the buffer memory 106 into a plurality of ATM cells according to the traffic class and traffic parameters of a corresponding logical connection which has been informed by the connection management unit 104 so as to send out each of the plurality of ATM cells on the ATM network.

Figure 2:
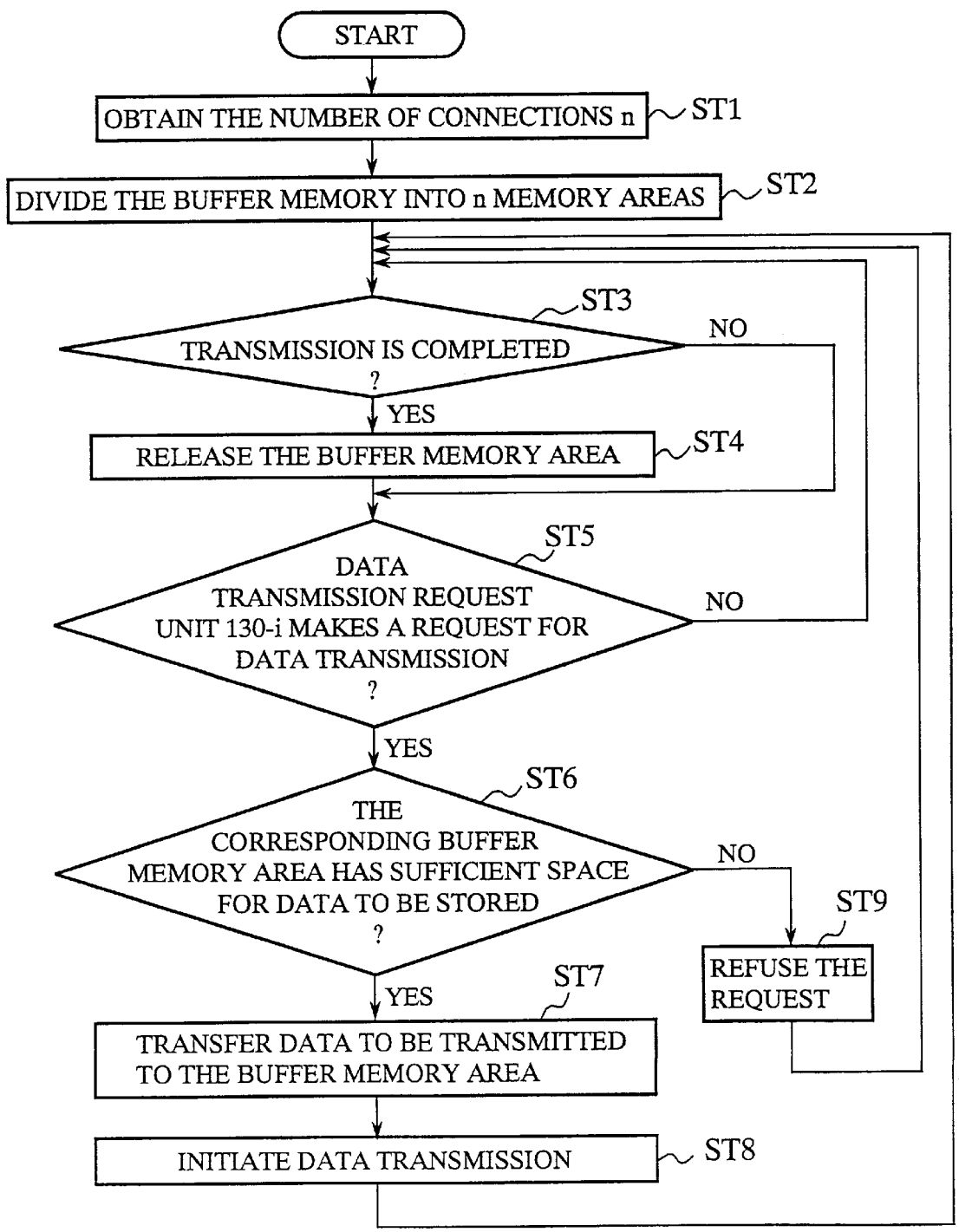
FIG. 2 is a flow diagram showing an example of the management operation of a buffer memory management unit of the ATM communication device using the transmission buffer memory management method according to the first embodiment of the present invention.

Referring next to FIG. 2, there is illustrated a flow diagram showing an example of the management operation of the buffer memory management unit 105 on the buffer memory 106. The connection management unit 104 manages information about the traffic class, traffic parameters, and so on of each of the plurality of logical connections which is used by each of the plurality of data transmission request units 103-1 through 103-n when it sends a data. The buffer memory management unit 105, in step ST1, obtains the number of the plurality of logical connections N from the connection management unit 104 first. The buffer memory management unit 105 then equally divides the buffer memory 106 into a plurality of buffer memory areas 106-1 through 106-n by the number of the plurality of logical connections N, in step ST2. The buffer memory management unit 105 then assigns the plurality of buffer memory areas 106-1 through 106-n to the respective data transmission request units 103-1 through 103-n. That is, the plurality of buffer memory areas 106-1 through 106-n are in a one-to-one correspondence with the plurality of data transmission request units 103-1 through 103-n.

The buffer memory management unit 105 then determines if each data transmission request unit 103-i ($1 \leq i \leq n$) furnishes a request for data transmission, in step ST5. Unless the buffer memory management unit 105 receives a request for data transmission from each data transmission request unit 103-i, the buffer memory management unit 105 only waits for a request for data transmission. If the buffer memory management unit 105 receives a request for data transmission from one data transmission request unit 103-i, the buffer memory management unit 105, in step ST6, determines whether or not there is sufficient free space for a data to be transmitted to be stored in the corresponding buffer memory area 106-i ($1 \leq i \leq n$) which is in a one-to-one correspondence with the data transmission request unit 103-i. Unless the buffer memory area 106-i has sufficient space for the data to be stored therein, the buffer memory management unit 105, in step ST9, refuses the data transmission request from the data transmission request unit 103-i and then waits for another request for data transmission. On the contrary, if the buffer memory area 106-i has sufficient space for the data to be transmitted to be stored therein, the buffer memory management unit 105, in step ST7, transfers the data to be transmitted from the data transmission request unit 103-i to the buffer memory area 106-i of the buffer memory 106 which is assigned to the data transmission request unit 103-i. The ATM communication device, in step ST8, then enables the data transmission unit 107 to start the data transmission.

After the data transmission unit 107 reads the data to be transmitted stored in the buffer memory area 106-i of the buffer memory 106, the data transmission unit 107 segments the data into a plurality of ATM cells according to the traffic class and traffic parameters of the logical connection to be used provided by the connection management unit 104 and then sends out the plurality of ATM cells on the ATM network cell by cell. The buffer memory management unit 105 determines if the ATM cell transmission is completed. When the buffer memory management unit 105, in step ST3, determines that the transmission is completed, it releases the buffer memory area 106-i of the buffer memory 106 where the transmitted data from the data transmission request unit 103-i has been stored, in step ST4.

Accordingly, even though a data transmission request unit 103-i makes a request for transmission of a large amount of data, the buffer memory 106 cannot be occupied by the data to be transmitted which is transferred thereto according to the data transmission request and therefore the buffer memory management unit can receive a request for data transmission from another data transmission request unit, because the buffer memory 106 disposed in the ATM terminal is equally divided into N buffer memory areas by the number of the plurality of logical connections N established between the ATM terminal and other ATM terminals, and the N buffer memory areas are assigned to the respective data transmission request units 103-1 through 103-n in advance of data transmission.

Second Embodiment

Figure 3:
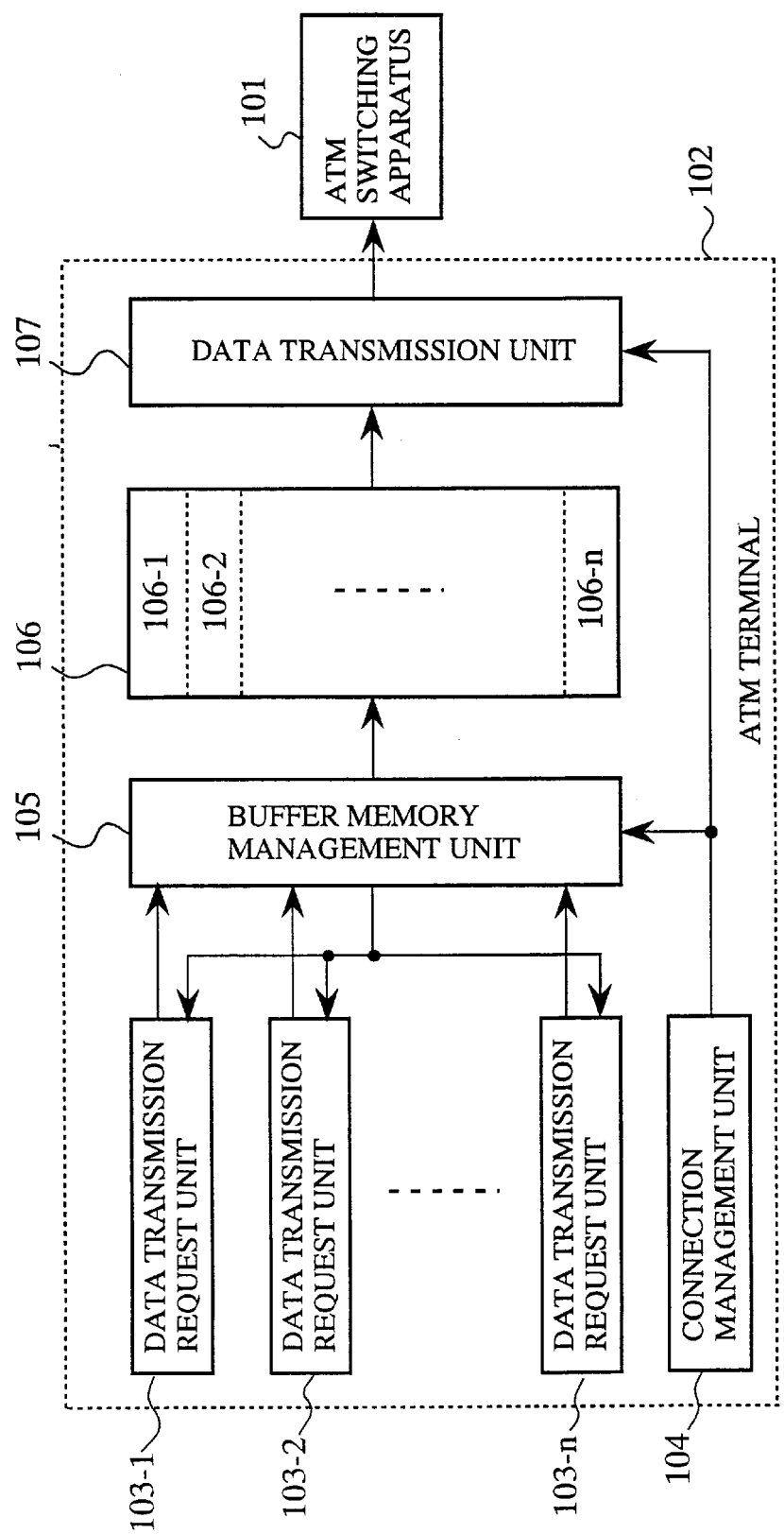
FIG. 3 is a block diagram showing the structure of an ATM communication device using a transmission buffer memory management method according to a second embodiment of the present invention.

Referring next to FIG. 3, there is illustrated a block diagram showing the structure of an ATM communication device using a transmission buffer memory management method according to a second embodiment of the present invention. In the figure, the same components as the ATM communication device according to the first embodiment are designated by the same reference numerals as FIG. 1, and therefore the description about the same components will be omitted hereinafter. The ATM communication device of the second embodiment differs from that of the first embodiment in that the buffer memory management unit 105 can inform the plurality of data transmission request units 103-1 through 103-n of the respective sizes of the buffer memory areas 106-1 through 106-n which have been assigned to the plurality of data transmission request units 103-1 through 103-n, respectively.

Figure 4:
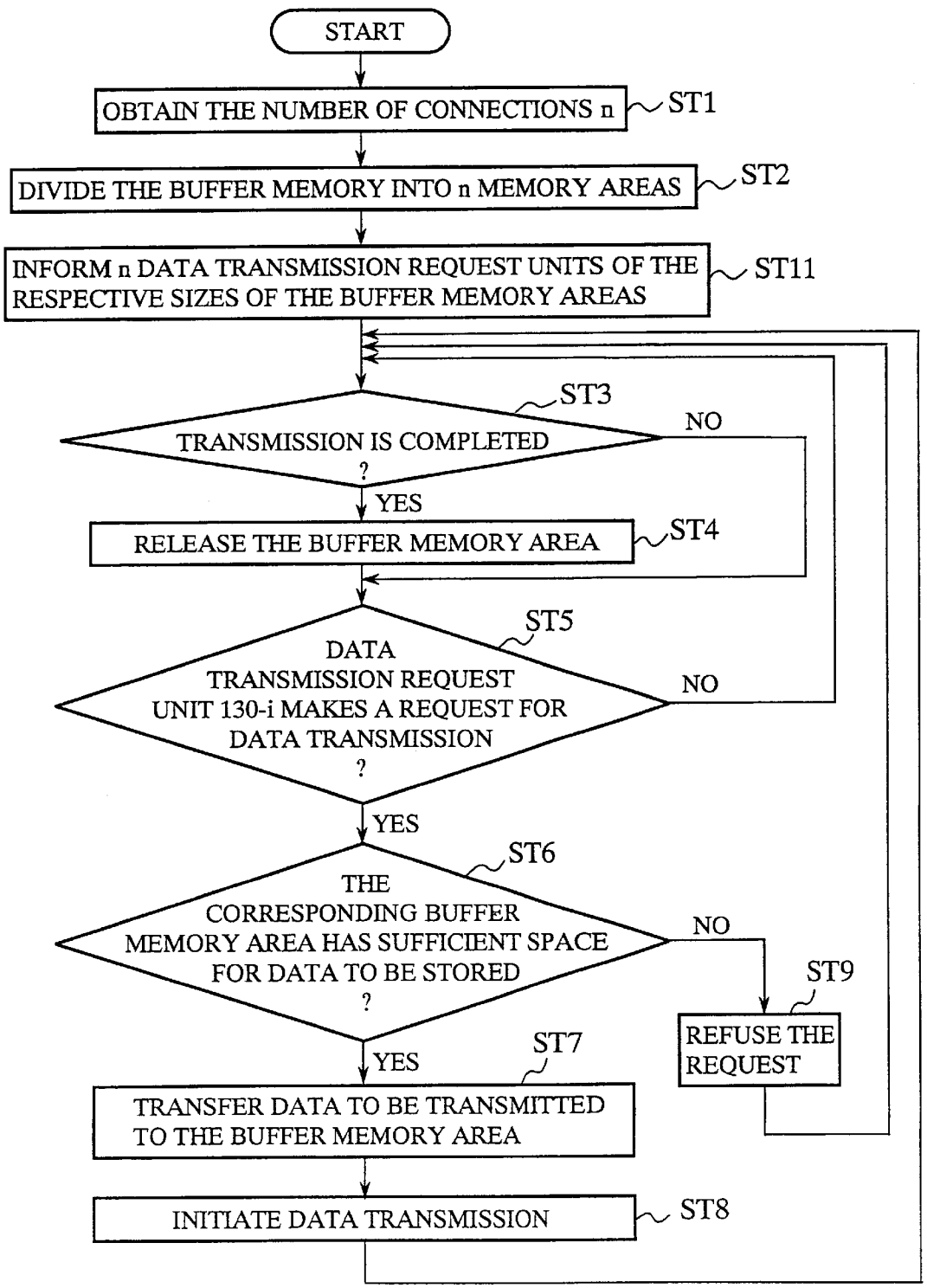
FIG. 4 is a flow diagram showing an example of the management operation of a buffer memory management unit of the ATM communication device using the transmission buffer memory management method according to the second embodiment of the present invention.

Referring next to FIG. 4, there is illustrated a flow diagram showing an example of the management operation of the buffer memory management unit 105 on the buffer memory 106. Hereinafter a description will be made as to the difference between the buffer memory management operation of the first embodiment and that of the second embodiment, and therefore the description about the same operation as the first embodiment will be omitted. The buffer memory management unit 105 equally divides the buffer memory 106 into a plurality of buffer memory areas 106-1 through 106-n by the number of the plurality of logical connections N. The buffer memory management unit 105 then assigns the plurality of buffer memory areas 106-1 through 106-n to the respective data transmission request units 103-1 through 103-n. That is, the plurality of buffer memory areas 106-1 through 106-n are in a one-to-one correspondence with the plurality of data transmission request units 103-1 through 103-n. After that, the buffer memory management unit 105, in step ST11, informs the plurality of data transmission request units 103-1 through 103-n of the respective sizes of the plurality of buffer memory areas 106-1 through 106-n of the buffer memory 106.

Accordingly, each data transmission request unit 103-i ($1 \leq i \leq n$) can have a knowledge of the size of the corresponding buffer memory area 106-i ($1 \leq i \leq n$) which has been assigned to each data transmission request unit 103-i ($1 \leq i \leq n$) before it starts to send a data. As a result, each data transmission request unit 103-i ($1 \leq i \leq n$) can reduce the size of a data to be transmitted upon making a request for data transmission to the size of the corresponding buffer memory area 106-i ($1 \leq i \leq n$). Thus the ATM terminal using the method of this embodiment can prevent each data transmission request unit 103-i ($1 \leq i \leq n$) from making a request for transmission of a data having a size which exceeds the size of the corresponding buffer memory area 106-i ($1 \leq i \leq n$), and hence prevent undesirable abandonment of data to be transmitted.

Third Embodiment

Figure 5:
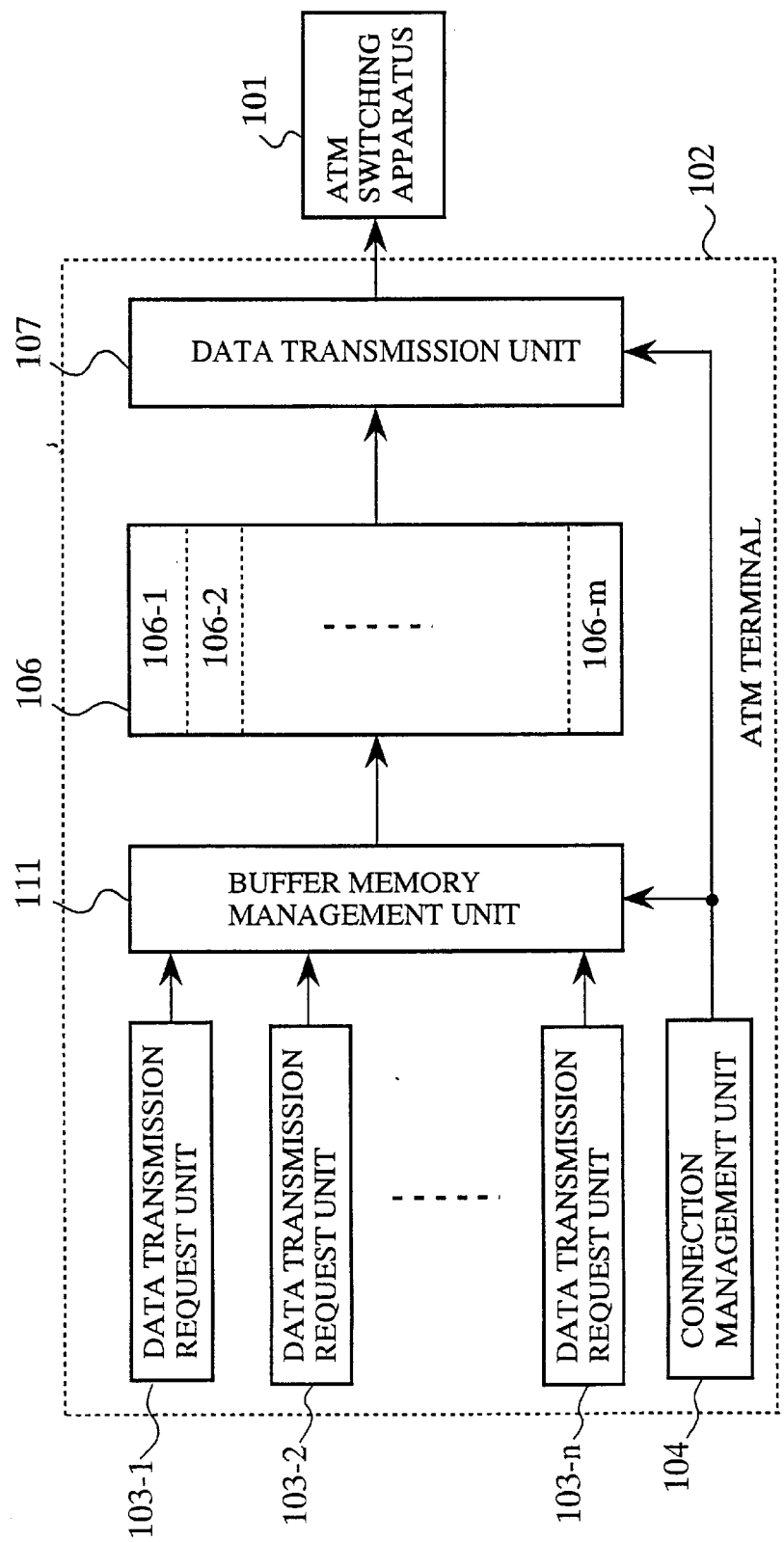
FIG. 5 is a block diagram showing the structure of an ATM communication device using a transmission buffer memory management method according to a third embodiment of the present invention.

Referring next to FIG. 5, there is illustrated a block diagram showing the structure of an ATM communication device using a transmission buffer memory management method according to a third embodiment of the present invention. In the figure, the same components as the ATM communication device according to the first embodiment are designated by the same reference numerals as FIG. 1, and therefore the description about the same components will be omitted hereinafter. The ATM communication device of the third embodiment differs from that of the first embodiment in that a plurality of logical connections established between the ATM communication device and other ATM terminals are grouped into M groups, that is, the plurality of data transmission request units 103-1 through 103-n are grouped into M groups and the buffer memory 106 is equally divided into M buffer memory areas.

Figure 6:
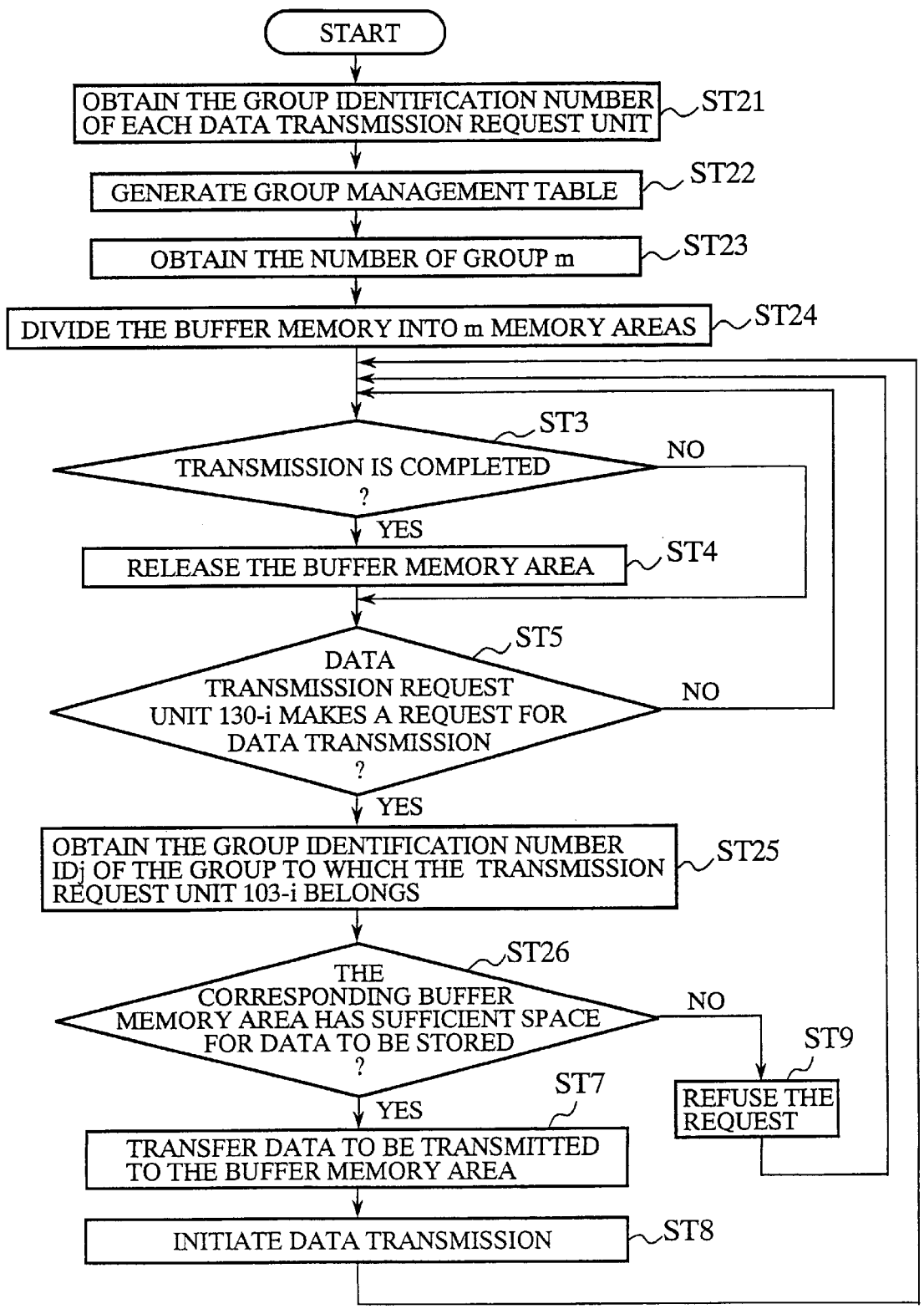
FIG. 6 is a flow diagram showing an example of the management operation of a buffer memory management unit of the ATM communication device using the transmission buffer memory management method according to the third embodiment of the present invention.

Referring next to FIG. 6, there is illustrated a flow diagram showing an example of the management operation of a buffer memory management unit 111 on the buffer memory 106. Hereinafter a description will be made as to the difference between the buffer memory management operation of the buffer memory management unit of the first embodiment and that of the third embodiment, and therefore the description about the same operation as the first embodiment will be omitted. An application program or the user can give each of the plurality of logical connections a number for identification by adding the group identification number to the setting parameters which define each of the plurality of logical connections through which a corresponding one of the plurality of data transmission request units 103-1 through 103-n can send out a data. The buffer memory management unit 111 obtains information showing which group identification number is given to each of the plurality of logical connections, i.e., each of the plurality of data transmission request units 103-1 through 103-n from the connection management unit 104, in step ST21. The buffer memory management unit 111 then generates a group management table TBL1 showing a correspondence between the plurality of logical connections 1 through N and the plurality of group identification numbers 1 through M, in step ST22; as shown in FIG. 7. The buffer memory management unit 111 thus determines that connections which have the same group identification number belong to the same group, and connections which have different group identification numbers belong to different groups. In the example shown in FIG. 7, it is determined that the connections 2 and 3 belong to the same group which is given the group identification number 2, and the connections 1 and 2 belong to the different groups which are respectively given the group identification numbers 1 and 2, respectively. The buffer memory management unit 111, in step ST23, obtains the number of groups M from the group management table TBL1 and, in step ST24, then equally divides the buffer memory 106 into M buffer memory areas 106-1 through 106-m. The plurality of buffer memory areas 106-1 through 106-m are assigned to the respective groups.

The buffer memory management unit 111 determines whether or not each data transmission request unit 103-i ($1 \leq i \leq n$) makes a request for data transmission, in step ST5. If one data transmission request unit 103-i ($1 \leq i \leq n$) makes a request for data transmission, the buffer memory management unit 111, in step ST25, gets the group identification number IDj ($1 \leq IDj \leq M$) of the group to which the data transmission request unit 103-i belongs from the group management table TBL1. The buffer memory management unit 111 determines whether or not there is sufficient free space in the buffer memory area 106-j ($1 \leq j \leq m$) which is in a one-to-one correspondence with the group identification number IDj, in step ST26. Unless the buffer memory area 106-j has sufficient space for a data to be transmitted to be stored therein, the buffer memory management unit 111, in step ST9, refuses the data transmission request from the data transmission request unit 103-i. on the contrary, if the buffer memory area 106-j has sufficient space for a data to be transmitted to be stored therein, the buffer memory management unit 111, in step ST7, transfers the data to be transmitted from the data transmission request unit 103-i to the buffer memory area 106-j of the buffer memory 106. The ATM communication device, in step ST8, then enables the data transmission unit 107 to start the data transmission.

Accordingly, while there is a possibility that connections with the same group identification number have an effect on each other because a single buffer memory area is assigned to them and therefore they share the same buffer memory area, connections with different identification numbers don't have an effect on each other because different buffer memory areas are assigned to the respective logical connections. In the same manner as the concept of network band reservation in an ATM network, the buffer memory in the ATM terminal can be reserved for each of a plurality of logical connections, such as connections for use in constant bit rate (CBR) service or variable bit rate (VBR) service, the quality of which needs to be insured by assigning a band of the network to each of the plurality of logical connections in advance, by giving the plurality of logical connections respective group identification numbers. In addition, an identical buffer memory area can be shared by a plurality of logical connections such as connections with high quality in use for available bit rate (ABR) service in which only a peak cell rate (PCR) is defined, and data are transmitted at PCR if the ATM network is available but data are transmitted at PCR or less if the ATM network becomes crowded, by giving the plurality of logical connections an identical group identification number. Thus each of the plurality of logical connections with the same group identification number can use the buffer memory when the corresponding buffer memory area has sufficient free space in the same manner that each of the plurality of logical connections can use the network if the network is available.

Fourth Embodiment

Figure 8:
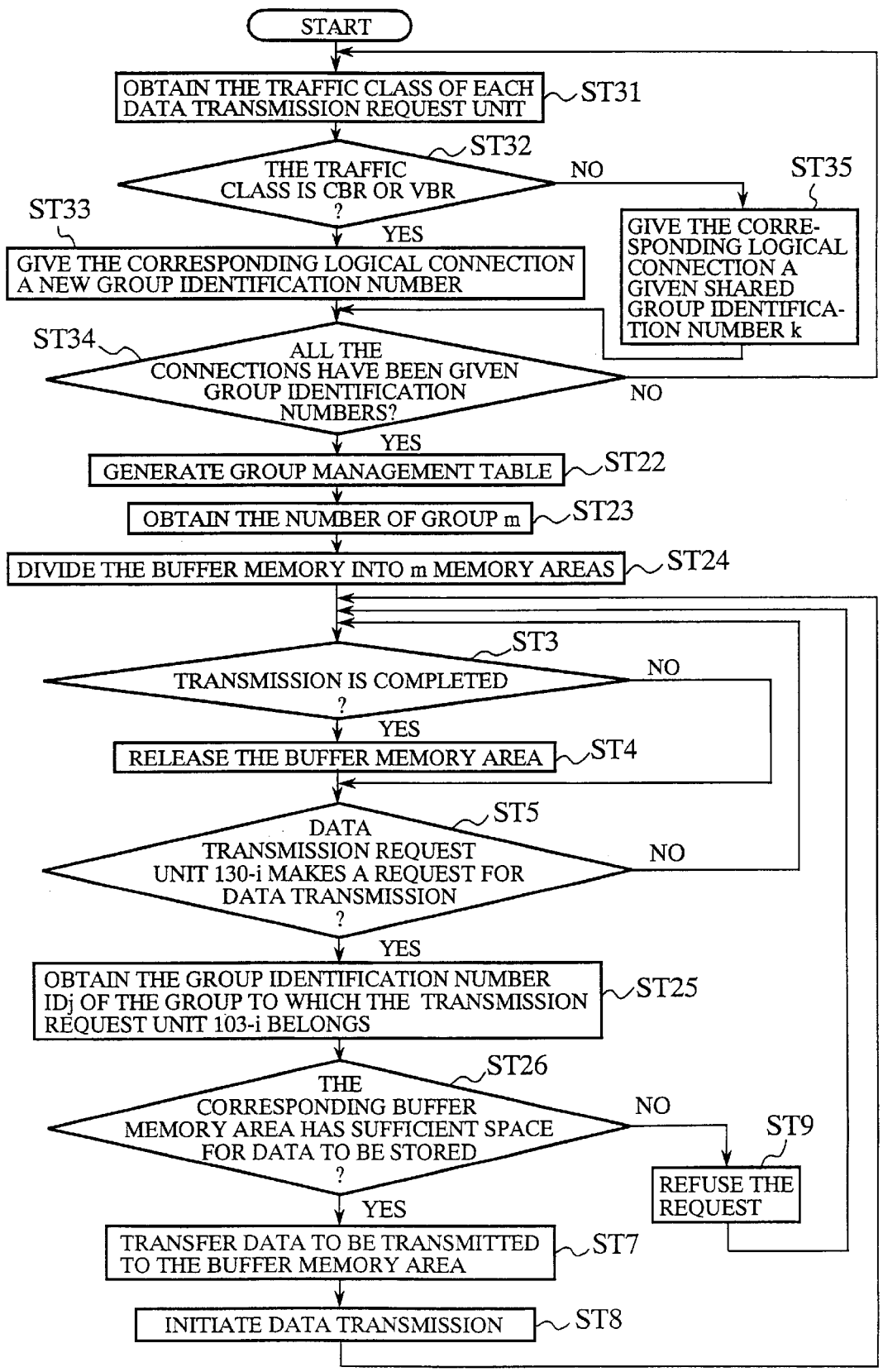
FIG. 8 is a flow diagram showing an example of the management operation of a buffer memory management unit of an ATM communication device using a transmission buffer memory management method according to a fourth embodiment of the present invention.

Referring next to FIG. 8, there is illustrated a flow diagram showing an example of the management operation of a buffer memory management unit 111 disposed in an ATM communication device using a transmission buffer memory management method according to a fourth embodiment of the present invention on a buffer memory 106. Hereinafter a description will be made as to the difference between the buffer memory management operation shown in FIG. 6 of the buffer memory management unit of the third embodiment and that of the fourth embodiment, and therefore the description about the same operation as the third embodiment will be omitted. The buffer memory management unit 111, in step ST31, gets information about the traffic class of each of the plurality of logical connections, which correspond to the plurality of data transmission request units 103-1 through 103-n, respectively, from the connection management unit 104. The buffer memory management unit 111 then determines if each traffic class is CBR or VBR, in step ST32. If the traffic class is CBR or VBR, the buffer memory management unit 111 automatically gives a corresponding logical connection a new group identification number IDj ($1 \leq IDj \leq M$), in step ST33. If the traffic class is not CBR and VBR but it is ABR, the buffer memory management unit 111 automatically gives a corresponding logical connection a given shared group identification number K, in step ST35. The buffer memory management unit performs the same operations as steps ST31, ST32, and ST33 or ST35 on all the logical connections, in step ST34, and it then generates a group management table TBL2 as shown in FIG. 9, in step ST22.

Thus the buffer memory management unit 111 can automatically give each of logical connections through which a data is to be transmitted at CBR or VBR a different group identification number, and automatically give each of connections through which a data is to be transmitted at ABR the same identical group identification number K, according to information about the traffic class such as CBR, VBR, or ABR which was added to the setting parameters which define each of the plurality of logical connections when establishing each of the plurality of logical connections. The automatic grouping of logical connections makes it possible to realize efficient use of the buffer memory disposed in the ATM terminal without making an application program or the user be awareness of the grouping.

Fifth Embodiment

Figure 10:
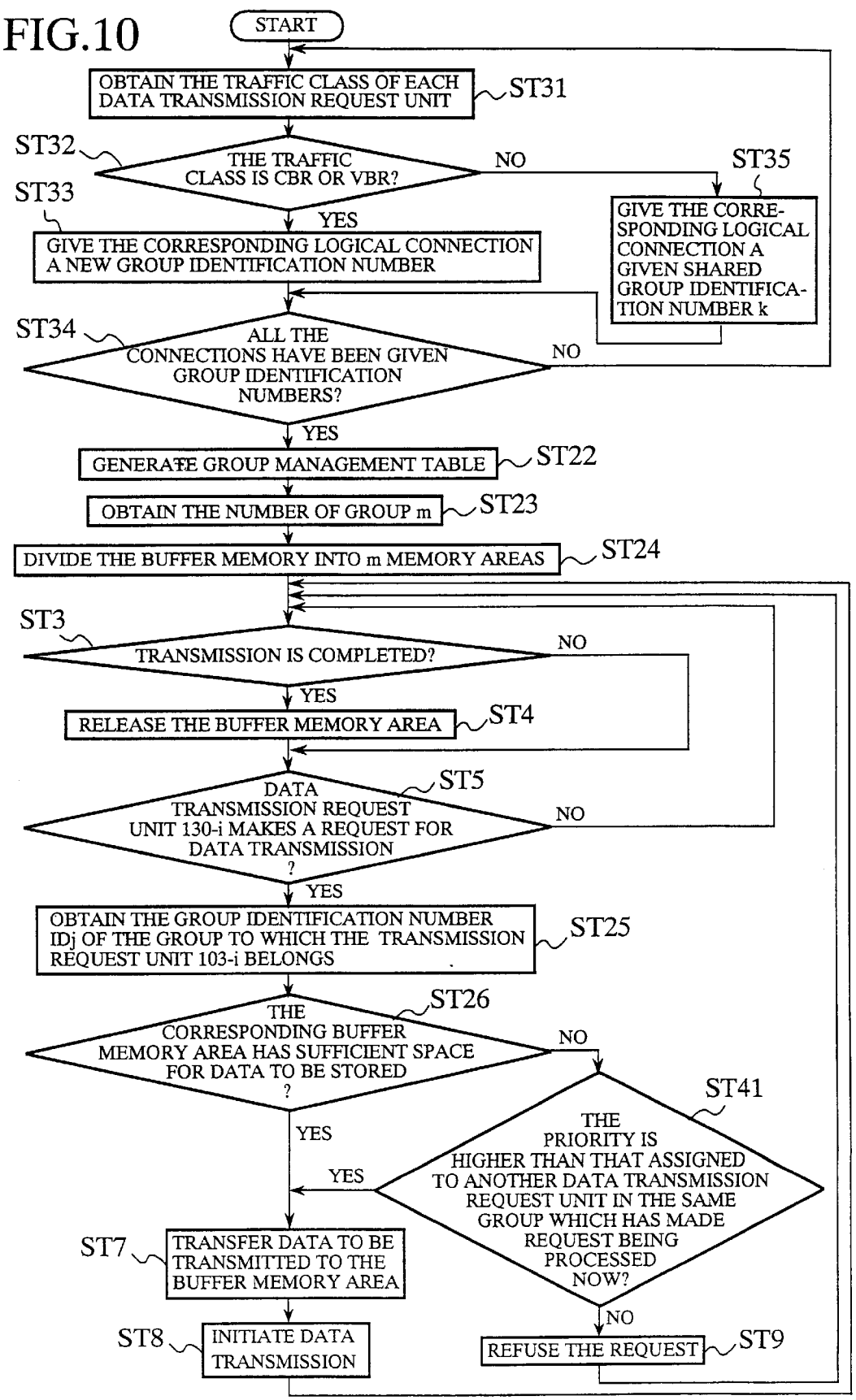
FIG. 10 is a flow diagram showing an example of the management operation of a buffer memory management unit of an ATM communication device using a transmission buffer memory management method according to a fifth embodiment of the present invention.

Referring next to FIG. 10, there is illustrated a flow diagram showing an example of the management operation of a buffer memory management unit 111 disposed in an ATM communication device using a transmission buffer memory management method according to a fifth embodiment of the present invention on a buffer memory 106. Hereinafter a description will be made as to the difference between the buffer memory management operation shown in FIG. 8 of the buffer memory management unit of the fourth embodiment and that of the fifth embodiment, and therefore the description about the same operation as the fourth embodiment will be omitted. FIG. 11 shows an example of a group management table TBL3 generated by the buffer memory management unit 111 of the fifth embodiment. The group management table TBL3 differs from the group management table TBL2, as shown in FIG. 9, generated by the buffer memory management unit 111 of the above-mentioned fourth embodiment in that a plurality of logical connections with the traffic class of ABR are managed as one group which is given the group identification number K, and priorities are further assigned to the plurality of logical connections which belong to the same group.

For example, in response to a request for data transmission from the data transmission request unit 103-3, the buffer memory management unit 111 gets the group identification number K given to the group to which the data transmission request unit 103-3 belongs from the group management table TBL3, in step ST25. The buffer memory management unit 111 then determines if there is sufficient free space for a data to be transmitted to be stored in the buffer memory area 106-k which is assigned to and is in a one-to-one correspondence with the group identification number K, in step ST26. If there is sufficient free space in the buffer memory area 106-k which corresponds to the group identification number K, the buffer memory management unit 111 transfers the data to be transmitted from the data transmission request unit 103-3 to the buffer memory area 106-k, in step ST7. The ATM communication device, in step ST8, then enables the data transmission unit 107 to start the data transmission.

After that, if the buffer memory management unit 111 receives a request for data transmission from the data transmission request unit 103-5 to which the same priority as the data transmission request unit 103-3 is assigned, the buffer memory management unit 111 gets the group identification number K given to the group to which the data transmission request unit 103-5 belongs from the group management table TBL3, in step ST25. The buffer memory management unit 111 then determines if there is sufficient free space for a data to be transmitted to be stored in the buffer memory area 106-k, which is assigned to and is in a one-to-one correspondence with the group identification number K, in step ST26. If there is sufficient free space in the buffer memory area 106-k which corresponds to the group identification number K, the buffer memory management unit 111 transfers the data to be transmitted from the data transmission request unit 103-5 to the buffer memory area 106-k, in step ST7. The ATM communication device, in step ST8, then enables the data transmission unit 107 to start the data transmission. On the contrary, if it is determined, in step ST26, that there is no sufficient space in the buffer memory area 106-k which corresponds to the group identification number K, the buffer memory management unit 111 determines if the priority assigned to the data transmission request unit 103-3 which made the data transmission request which is being processed now is higher than that assigned to the data transmission request unit 103-5 which has made the current data transmission request, by referring to the group management table TBL3, in step ST41. If these priorities are at the same level, the buffer memory management unit 111, in step ST9, refuses the current request for data transmission from the data transmission request unit 103-5.

If the buffer memory management unit 111 receives a request for data transmission from the data transmission request unit 103-6 to which a priority higher than that of the data transmission request unit 103-3 is assigned while the ATM communication device is sending out the data from the data transmission request unit 103-3 on the ATM network, the buffer memory management unit 111 determines if the priority assigned to the data transmission request unit 103-3 which made the data transmission request which is being processed now is higher than that assigned to the data transmission request unit 103-6 which has made the current data transmission request, by referring to the group management table TBL3, in step ST41. In this case, since the priority assigned to the data transmission request unit 103-6 is higher than that assigned to the data transmission request unit 103-3, the buffer memory management unit 111 immediately transfers the data to be transmitted from the data transmission request unit 103-6 to the buffer memory area 106-k without refusing the request for data transmission from the data transmission request unit 103-6, in step ST7.

Thus, when the buffer memory area assigned to a plurality of logical connections, for example, having the traffic class of ABR which belong to one group is occupied by data to be transmitted by way of some connections with the lower priority which belong to the same group, if the buffer memory management unit 111 receives a request for data transmission by way of another connection with the higher priority which belongs to the same group from another data transmission request unit, the buffer memory management unit 111 overwrites another data to be transmitted by way of the other connection with the higher priority into the corresponding buffer memory area already occupied by data to be transmitted by way of some connections with the lower priority. As a result, the ATM communication device can send out the other data immediately.

Sixth Embodiment

Figure 12:
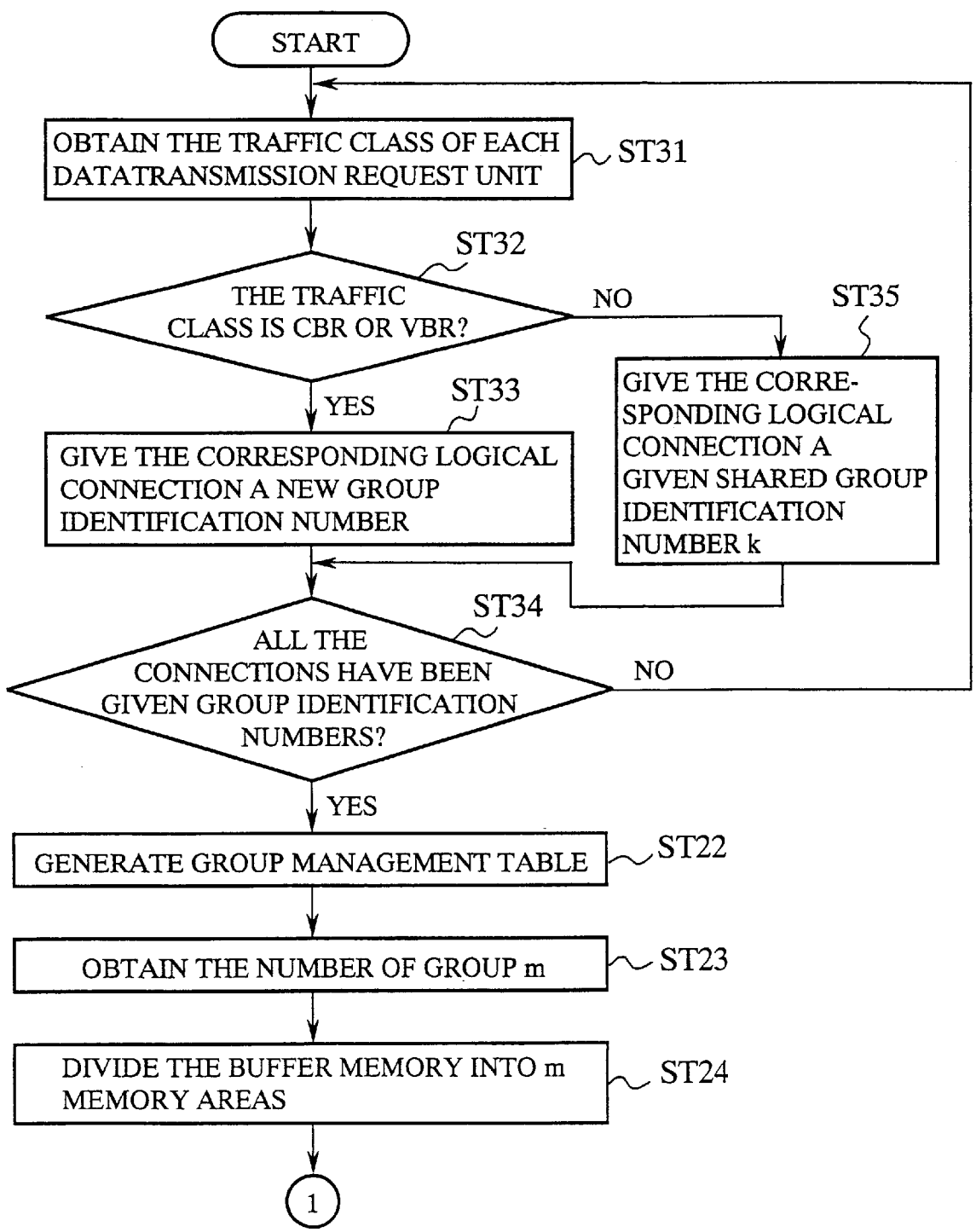
FIGS. 12 and 13 are flow diagrams showing an example of the management operation of a buffer memory management unit of an ATM communication device using a transmission buffer memory management method according to a sixth embodiment of the present invention.
Figure 13:
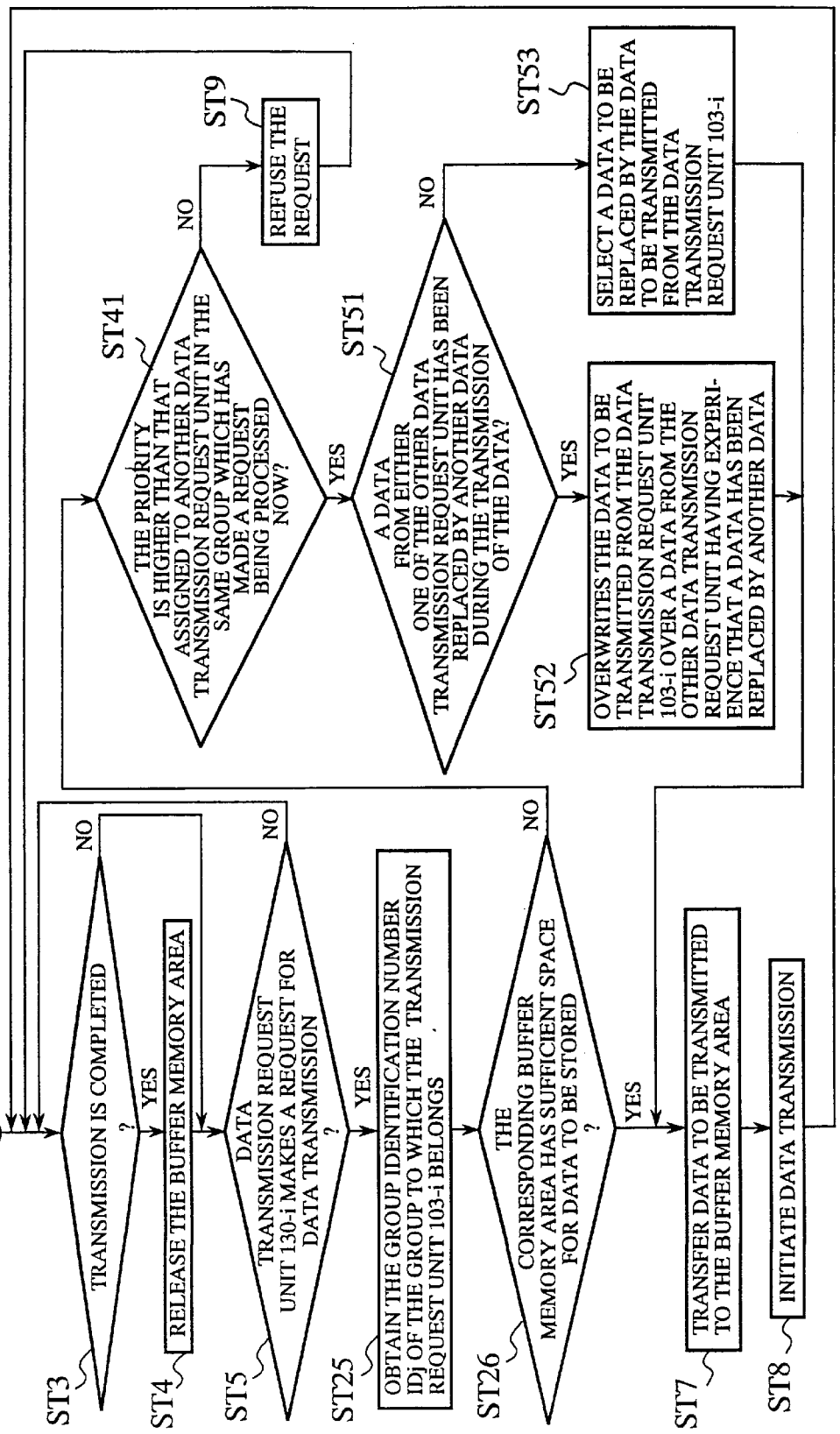

Referring next to FIGS. 12 and 13, they illustrate a flow diagram showing an example of the management operation of a buffer memory management unit 111 disposed in an ATM communication device using a transmission buffer memory management method according to a sixth embodiment of the present invention on a buffer memory 106. Hereinafter a description will be made as to the difference between the buffer memory management operation shown in FIG. 10 of the buffer memory management unit of the fifth embodiment and that of the sixth embodiment, and therefore the description about the same operation as the fifth embodiment will be omitted. For example, in response to a request for data transmission from the data transmission request unit 103-3, the buffer memory management unit 111 gets the group identification number K given to the group to which the data transmission request unit 103-3 belongs from the group management table TBL3, in step ST25. Similarly, in response to a request for data transmission from the data transmission request unit 103-5, the buffer memory management unit 111 gets the group identification number K given to the group to which the data transmission request unit 103-5 belongs from the group management table TBL3. The buffer memory management unit 111 then determines if there is sufficient free space for a data to be transmitted to be stored in the buffer memory area 106-k which corresponds to the group identification number K, in step ST26. If there is sufficient free space in the buffer memory area 106-k for data from the data transmission request units 103-3 and 103-5 to be stored, the buffer memory management unit 111 transfers the data to be transmitted from the data transmission request units 103-3 and 103-5 to the buffer memory area 106-k, in step ST7. The ATM communication device, in step ST8, then enables the data transmission unit 107 to start the data transmission.

After that, if the buffer memory management unit 111 further receives a request for data transmission from the data transmission request unit 103-6 which corresponds to the logical connection 6 with the same group identification number K as the logical connections 3 and 5 of the data transmission request units 103-3 and 103-5, the buffer memory management unit determines if there is sufficient free space in the buffer memory area 106-k, in step ST26. If there is no sufficient free space in the buffer memory area 106-k which corresponds to the group identification number K, the buffer memory management unit 111 compares the priority of the current data transmission request, in this case, from the data transmission request unit 103-6 with those of the previous data transmission requests which are being processed, in this case, from the data transmission request units 103-3 and 103-5, in step ST41. As a result, if the priority of the current data transmission request from the data transmission request unit 103-6 is lower than or equal to those of the previous data transmission requests from the data transmission request units 103-3 and 103-5, the buffer memory management unit 111 refuses the current data transmission request, in step ST9. On the contrary, if the priority of the current data transmission request from the data transmission request unit 103-6 is higher than those of the previous data transmission requests, the buffer memory management unit 111 determines whether or not a data to be transmitted from each of the data transmission request units 103-3 and 103-5 has been replaced by another data to be transmitted with the higher priority from another data transmission request unit during the transmission of the data, in step ST51.

When the buffer memory management unit 111 determines that both data from the data transmission request units 103-3 and 103-5 has never been replaced by another data to be transmitted with the higher priority from another data transmission request unit during the data transmission, the buffer memory management unit 111 overwrites a data to be transmitted from the data transmission request unit 103-6 with the higher priority which has made the current transmission request over one data to be transmitted from either one of the data transmission request units 103-3 and 103-5, for example, the data from the data transmission request unit 103-3, in steps ST53 and ST7. The ATM communication device, in step ST8, then enables the data transmission unit 107 to start the data transmission.

On the contrary, if it is determined, in step ST51, that a data from either one of the data transmission request units 103-3 and 103-5, e.g., a data from the data transmission request unit 103-5 has been replaced by another data from another data transmission request unit with the higher priority during the data transmission, the buffer memory management unit 111 overwrites another data to be transmitted from the data transmission request unit 103-6 with the higher priority which has made the current transmission request over the data to be transmitted from the data transmission request unit 103-5, in steps ST53 and ST7. The ATM communication device, in step ST8, then enables the data transmission unit 107 to start the data transmission.

For example, when sending out a message by using a host application program, the abandonment of only one data to be transmitted included in a plurality of data into which one message is segmented results in the abandonment of the whole of the message. Therefore, if such the abandonment of data to be transmitted is performed on a plurality of data to be transmitted by way of a plurality of logical connections, a plurality of messages which are to be sent out by way of the plurality of logical connections, respectively, must be abandoned. In order to prevent such the abandonment of messages, the buffer memory management unit according to the sixth embodiment of the present invention is adapted to replace a data which is being sent out by way of a logical connection with the lower priority with another data which is to be sent out by way of another logical connection with the higher priority if a data to be transmitted by way of the former logical connection with the lower priority has been replaced by another data during the transmission of the data. Thus a request for data transmission by way of a logical connection with the lower priority having no experience that a data to be transmitted associated with the logical connection has been replaced during the transmission of the data has precedence over a request for data transmission by way of another logical connection with the lower priority having such experience. When needing to replace a plurality of data to be transmitted with other data to be transmitted, the buffer memory management unit can prevent its overwriting operation from spreading over a plurality of logical connections although it replaces the same number of a plurality of data. Accordingly, even if a request for data transmission by way of a logical connection with the higher priority is made, the buffer memory management unit of this embodiment can fulfil a request for data transmission by way of a logical connection with the lower priority having no experience that a data to be transmitted associated with the logical connection has been overwritten during the transmission of the data and hence can prevent a data to be transmitted by way of such a logical connection being abandoned.

As a result, when needing to overwrite a data to be transmitted from a data transmission request unit with the higher priority, in the above case, the data transmission request unit 103-6 over another data, which is being sent out on the ATM network, from another data transmission request unit with the lower priority, in the above case, the data transmission request unit 103-3 or 103-5, the buffer memory management unit 111 selects a data to be transmitted from a data transmission request unit with the lower priority having experience that a data which it transferred to the buffer memory has been overwritten during the transmission of the data and then replaces the selected data with the new data from the data transmission request unit with the higher priority, or replaces either one of data to be transmitted from data transmission request units with the new data from the data transmission request unit with the higher priority if all the data transmission request units have no experience that data which they transferred to the buffer memory have been overwritten during the data transmission. Therefore, even if a request for data transmission by way of a logical connection with the higher priority is made, the ATM communication device of this embodiment can fulfil a request for data transmission by way of a logical connection with the lower priority having no experience that a data to be transmitted associated with the logical connection has been overwritten during the transmission of the data, and hence can prevent messages each of which is constructed of a plurality of data to be transmitted and which can be handled by a host application program from at least one of data transmission request units with the lower priority from being abandoned. The sixth embodiment of the present invention thus offers an advantage of being able to reduce the rate at which messages which can be handled by a host application program are abandoned.

Seventh Embodiment

Figure 14:
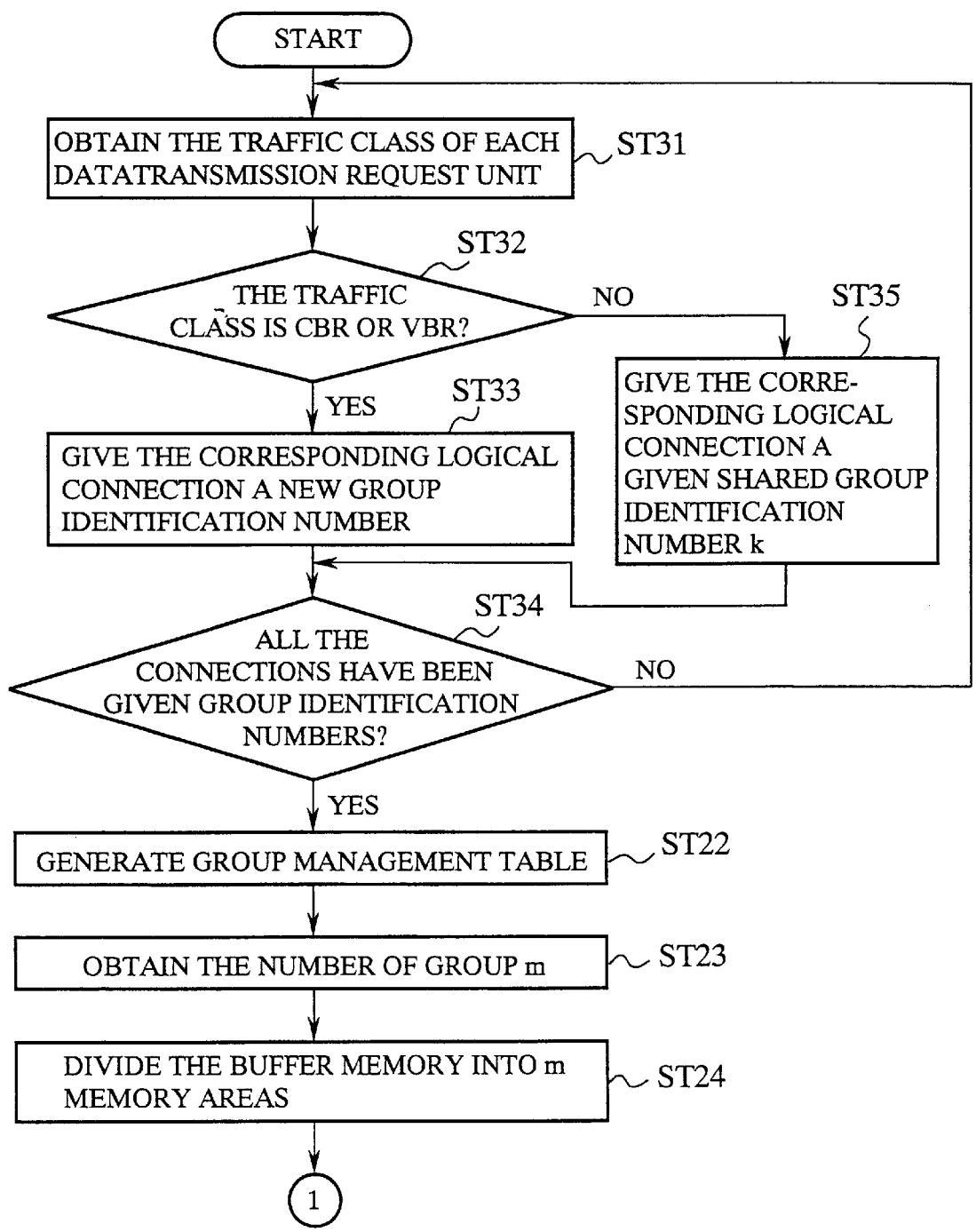
FIGS. 14 and 15 are flow diagrams showing an example of the management operation of a buffer memory management unit of an ATM communication device using a transmission buffer memory management method according to a seventh embodiment of the present invention.
Figure 15:
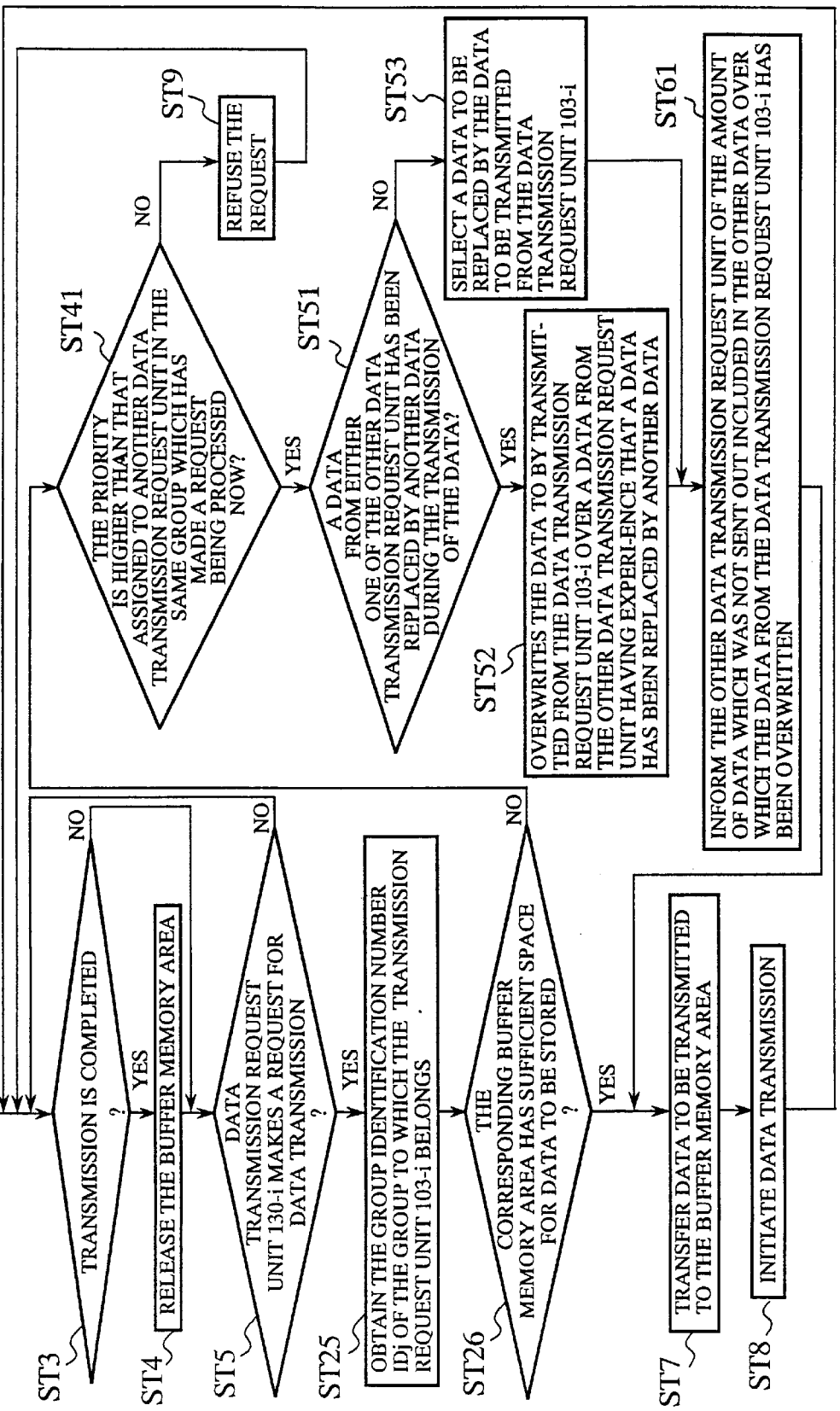
Figure 16:
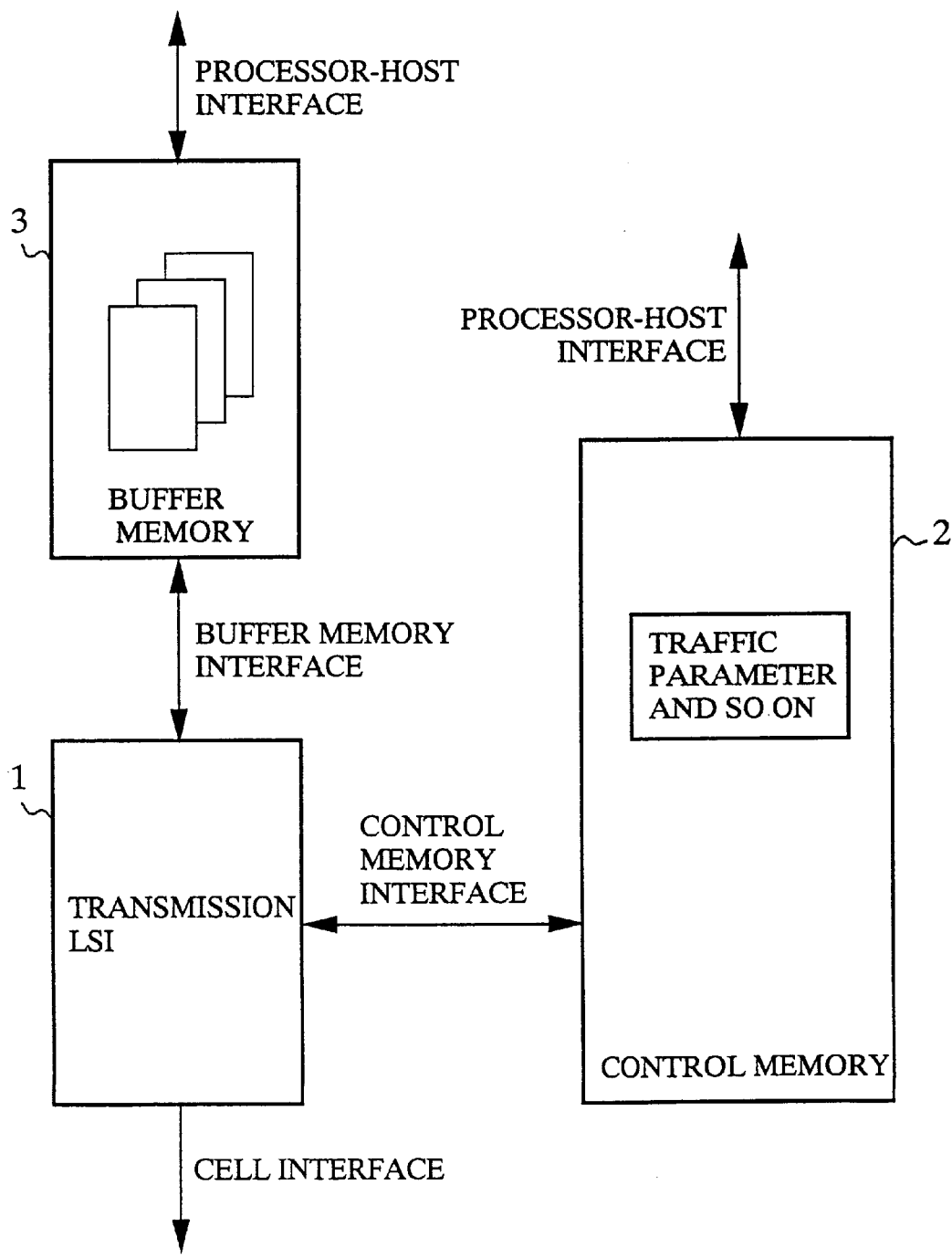
FIG. 16 is a block diagram showing the structure of an ATM communication device using a prior art transmission buffer memory management method.

Referring next to FIGS. 14 and 15, they illustrate a flow diagram showing an example of the management operation of a buffer memory management unit 111 disposed in an ATM communication device using a transmission buffer memory management method according to a seventh embodiment of the present invention on a buffer memory 106. Hereinafter a description will be made as to the difference between the buffer memory management operation shown in FIGS. 12 and 13 of the buffer memory management unit of the sixth embodiment and that of the seventh embodiment, and therefore the description about the same operation as the sixth embodiment will be omitted.

When the buffer memory management unit 111 overwrites a data to be transmitted from a data transmission request unit which corresponds to a logical connection with the higher priority over another data, which is stored in the buffer memory area 106-k, from another data transmission request unit with the lower priority grouped into the same group, in step ST52 or ST53, the buffer memory management unit 111 informs the other data transmission request unit with the lower priority of the amount of a part of the other data which has not been sent out included in the other data over which the data to be transmitted from the former data transmission request unit with the higher priority is overwritten, in step ST61. Accordingly, the data transmission request unit with the lower priority can know the amount of the part of the other data which has not been sent out and then carry out the data transmission from the not-yet-transmitted part of the data the transmission of which was suspended even though a data to be transmitted which it transferred to the buffer memory has been overwritten during the transmission of the data.

As previously explained, each of the steps ST2 and ST24 in the first through seventh embodiments of the present invention is the step of dividing the transmission buffer memory into a plurality of memory areas each for temporarily storing a data to be transmitted associated with a request for data transmission, and the step ST11 is the step of, according to information about a plurality of logical connections established between the ATM terminal and other ATM terminals, assigning each of the plurality of memory areas to at least a transmission request source which uses a corresponding one of the plurality of logical connections. Furthermore, the combination of the steps ST5, ST6, and ST26 is the step of determining if there is sufficient free space for a data to be transmitted to be stored in a corresponding memory area of the buffer memory which is assigned to the transmission request source, and the combination of the steps ST7 through ST9 is the step of controlling transfer of the data to be transmitted which is associated with the above data transmission request to the corresponding memory area according to a determination result obtained by the determining step. Each of the steps ST1 and ST23 is the step of obtaining the number of the plurality of logical connections each of which is used by a corresponding transmission request source when it sends a data to another ATM terminal on the ATM network.

As previously mentioned, the present invention offers the following advantages.

In accordance with a preferred embodiment of the present invention, there is provided a method of managing a transmission buffer memory disposed in an asynchronous transfer mode (ATM) terminal connected to an ATM network for transmitting and receiving data by way of the ATM network, comprising the steps of: dividing the transmission buffer memory into a plurality of memory areas each for temporarily storing a data to be transmitted associated with a request for data transmission; according to information about a plurality of logical connections established between the ATM terminal and other ATM terminals, assigning each of the plurality of memory areas to at least a transmission request source which uses a corresponding one of the plurality of logical connections; in response to a request for data transmission from a transmission request source, determining if there is sufficient free space for a data to be transmitted to be stored in a corresponding memory area of the buffer memory which is assigned to the transmission request source; and controlling transfer of the data to be transmitted which is associated with the above data transmission request to the corresponding memory area according to a determination result obtained by the above determining step. Accordingly, this embodiment provides an advantage of being able to prevent the buffer memory from being occupied by a data to be transmitted associated with a request for data transmission by way of a logical connection and hence avoiding bringing about a state wherein data transmission by way of another logical connection is enabled, thereby realizing efficient use of the buffer memory.

In accordance with another preferred embodiment of the present invention, the controlling step can include transferring the data to be transmitted which is associated with the data transmission request to the corresponding memory area in order to transmit the data to another ATM terminal on the ATM network, when it is determined, in the determining step, that there is sufficient free space for a data to be transmitted to be stored in the corresponding memory area of the buffer memory, and refusing the request for data transmission and then waiting for another request for data transmission, when it is determined, in the determining step, that there is no sufficient free space for the data to be transmitted to be stored in the corresponding memory area of the buffer memory. Accordingly, a data to be transmitted associated with a request for data transmission by way of a logical connection is transferred to only a corresponding memory area of the buffer memory. This embodiment thus provides an advantage of being able to prevent the buffer memory from being occupied by a data to be transmitted associated with a request for data transmission by way of a logical connection and hence avoiding bringing about a state wherein data transmission by way of another logical connection is enabled, thereby realizing efficient use of the buffer memory.

In accordance with another preferred embodiment of the present invention, the method further comprises the step of obtaining the number of the plurality of logical connections each of which is used by a corresponding transmission request source when it sends a data to another ATM terminal on the ATM network. Furthermore, the dividing step includes dividing the buffer memory into a plurality of memory areas each for temporarily storing a data to be transmitted which is associated with a request for data transmission by the number of the plurality of logical connections obtained in the obtaining step, and the assigning step includes assigning the plurality of memory areas to the respective transmission request sources each for making a request to send a data. Accordingly, a data to be transmitted associated with a request for data transmission from a transmission request source is transferred to only a corresponding memory area of the buffer memory which is assigned to a logical connection which corresponds to the transmission request source. This embodiment thus provides an advantage of being able to prevent the buffer memory from being occupied by a data to be transmitted associated with a request for data transmission by way of a logical connection and hence avoiding bringing about a state wherein data transmission by way of another logical connection is enabled, thereby realizing efficient use of the buffer memory.

In accordance with another preferred embodiment of the present invention, the dividing step includes equally dividing the buffer memory into a plurality of memory areas by the number of the plurality of logical connections. Accordingly, a data to be transmitted associated with a request for data transmission from a transmission request source is transferred to only a corresponding memory area of the buffer memory equally divided by the number of the plurality of logical connections which is assigned to a logical connection which corresponds to the transmission request source. This embodiment thus provides an advantage of being able to prevent the buffer memory from being occupied by a data to be transmitted associated with a request for data transmission by way of a logical connection and hence avoiding bringing about a state wherein data transmission by way of another logical connection is enabled, thereby realizing efficient use of the buffer memory.

In accordance with another preferred embodiment of the present invention, the assigning step further includes informing each of the plurality of transmission request sources of the storage capacity of the corresponding memory area which is assigned to each of the plurality of transmission request sources. Accordingly, this embodiment offers an advantage of being able to avoid bringing about a state wherein transmission of a data the size of which exceeds the size of the buffer memory is enabled, thereby realizing efficient use of the buffer memory.

In accordance with another preferred embodiment of the present invention, the method further comprising the step of grouping the plurality of logical connections each of which is used by a corresponding transmission request source when it sends a data to another ATM terminal on the ATM network into a plurality of groups. Furthermore, the dividing step includes equally dividing the buffer memory into a plurality of memory areas by the number of the plurality of groups obtained in the grouping step, and the assigning step includes assigning the plurality of memory areas to the plurality of groups, respectively. Accordingly, a data to be transmitted associated with a request for data transmission by way of a logical connection is transferred to only a corresponding memory area of the buffer memory which is assigned to one group to which the logical connection belongs. This embodiment thus offers an advantage of being able to realize efficient and flexible use of the buffer memory by grouping the plurality of logical connections according to the communication quality of the logical connections, for example.

In accordance with another preferred embodiment of the present invention, the grouping step includes grouping the plurality of logical connections into a plurality of groups according to their group identification numbers each of which has been added to setting parameters which define each of the plurality of logical connections which is used by a corresponding transmission request source when it sends a data. The method further generates a group management table including information about the grouping of the plurality of logical connections performed in the grouping step. The group management table can include information showing a correspondence between the plurality of logical connections each of which is used by a corresponding transmission request source when it sends a data and the plurality of group identification numbers each of which has been added to setting parameters which define each of the plurality of logical connections. Accordingly, a data to be transmitted associated with a request for data transmission by way of a logical connection is transferred to only a corresponding memory area of the buffer memory which is assigned to one group to which the logical connection belongs by referring to the group management table. This embodiment thus offers an advantage of being able to realize efficient and flexible use of the buffer memory by generating a group management table including information about grouping the plurality of logical connections according to the communication quality of the logical connections, for example.

In accordance with another preferred embodiment of the present invention, the grouping step includes giving each of the plurality of logical connections a group identification number according to the traffic class of each of the plurality of logical connections, and grouping the plurality of logical connections into a plurality of groups according to their group identification numbers given. The method further generates a group management table including information about the grouping of the plurality of logical connections performed in the grouping step. The group management table can include information showing a correspondence between the plurality of logical connections each of which is used by a corresponding transmission request source when it sends out a data and the plurality of group identification numbers each of which has been given to at least one of the plurality of logical connections according to the traffic class of at least one of the plurality of logical connections. Accordingly, a data to be transmitted associated with a request for data transmission by way of a logical connection is transferred to only a corresponding memory area of the buffer memory which is assigned to one of the plural groups, into which the plurality of logical connection have been grouped according to the traffic classes of the plurality of logical connection, to which the logical connection belongs, by referring to the group management table. This embodiment thus offers an advantage of being able to realize efficient and flexible use of the buffer memory which is divided according to the traffic classes of the plurality of logical connections.

In accordance with another preferred embodiment of the present invention, the grouping step can include automatically giving each of the plurality of logical connections a group identification number according to the traffic class of each of the plurality of logical connections, such as constant bit rate (CBR), variable bit rate (VBR), or available bit rate (ABR), and automatically grouping the plurality of logical connections into a plurality of groups according to their group identification numbers given. Accordingly, a data to be transmitted associated with a request for data transmission by way of a logical connection is transferred to only a corresponding memory area of the buffer memory which is assigned to one of the plural groups, into which the plurality of logical connection have been grouped automatically according to the traffic classes of the plurality of logical connection, such as CBR, VBR, or ABR, to which the logical connection belongs, by referring to the group management table. This embodiment thus offers an advantage of being able to realize efficient and flexible use of the buffer memory which is divided according to the traffic classes of the plurality of logical connections, such as CBR, VBR, or ABR.

In accordance with another preferred embodiment of the present invention, the grouping step further includes giving a plurality of logical connections with the traffic class of ABR an identical group identification number and therefore grouping the plurality of logical connections into one group, and assigning priorities to the plurality of logical connections which belong to the same group. The group management table can include information showing a correspondence of the plurality of logical connections each of which is used by a corresponding transmission request source when it sends out a data, the plurality of group identification numbers each of which has been given to at least one of the plurality of logical connections according to the traffic class of at least one of the plurality of logical connections such as CBR, VBR, and ABR, and the priorities which have been assigned to the plural logical connections with the traffic class of ABR and grouped into the same group. Furthermore, the controlling step includes controlling transfer of a data to be transmitted which is associated with a request for data transmission from a transmission request source to a corresponding memory area according to a determination result obtained by the determining step and the group management table. Accordingly, this embodiment thus offers an advantage of being able to, even when a request for data transmission by way of a logical connection grouped into the same group is made, realize efficient and flexible use of the buffer memory according to the determination result obtained by the determining step and the priority assigned to the logical connection written into the group management table.

In accordance with another preferred embodiment of the present invention, when a request for data transmission via one logical connection with the traffic class of ABR grouped into the same group is made, a data to be transmitted associated with the current data transmission request is transferred to a corresponding memory area which is assigned to the plurality of logical connections included in the same group, in the controlling step, if it is determined, in the determining step, there is sufficient free space for the data to be transmitted to be stored in the corresponding memory area. On the contrary, when it is determined, in the determining step, there is no sufficient free space for the data to be transmitted to be stored in the corresponding memory area, the priority assigned to the logical connection which is to be used by the above data transmission request is compared with the priority assigned to another logical connection which is being used by a previous data transmission request being processed now and the data to be transmitted associated with the above current data transmission request is then transferred to the corresponding memory area and is overwritten over another data to be transmitted associated with the previous data transmission request being processed now if the priority assigned to the logical connection associated with the current transmission request is higher than that assigned to the other logical connection associated with the previous transmission request being processed now, and the current data transmission request is refused and another request for data transmission is waited for if the priority assigned to the logical connection associated with the current data transmission request is lower than or equal to that assigned to the other logical connection associated with the previous data transmission request being processed now. Accordingly, this embodiment thus offers an advantage of being able to, when a request for data transmission by way of a logical connection with the traffic class of ABR grouped into the same group is made, realize efficient and flexible use of the buffer memory according to the priority assigned to the logical connection.

In accordance with another preferred embodiment of the present invention, when a request for data transmission via one logical connection with the traffic class of ABR grouped into the same group is made, a data to be transmitted associated with the current data transmission request is transferred to a corresponding memory area which is assigned to the plurality of logical connections included in the same group, in the controlling step, if it is determined, in the determining step, there is sufficient free space for the data to be transmitted to be stored in the corresponding memory area. On the contrary, when it is determined, in the determining step, there is no sufficient free space for the data to be transmitted to be stored in the corresponding memory area, the priority assigned to the logical connection associated with the above current data transmission request is compared with the priority assigned to another logical connection associated with a previous data transmission request being processed now and the data to be transmitted associated with the above current data transmission request is then transferred to the corresponding memory area and is overwritten over another data to be transmitted associated with the previous data transmission request being processed now, and transmission of the data to be transmitted associated with the current data transmission request is started, if the priority assigned to the logical connection associated with the current data transmission request is higher than that assigned to the other logical connection associated with the previous data transmission request being processed now and if a data to be transmitted from one transmission request source which made the previous data transmission request has been replaced by another data during the data transmission, and the current data transmission request is refused and another request for data transmission is waited for if the priority assigned to the logical connection associated with the current data transmission request is lower than or equal to that assigned to the other logical connection associated with the previous data transmission request being processed now. Accordingly, this embodiment offers an advantage of being able to, when a request for data transmission by way of a logical connection with the traffic class of ABR grouped into the same group is made, realize efficient and flexible use of the buffer memory according to the priority assigned to the logical connection and a determination result showing whether or not a data to be transmitted from the transmission request source which made the previous data transmission request has been replaced by another data during the transmission of the data. Therefore, this embodiment can usually limit the refusing to fulfill a request to a request for data transmission by way of a logical connection with the lower priority having experience that a data to be transmitted associated with the logical connection has been overwritten during the transmission of the data and hence can prevent a message which is to be sent out by way of a logical connection with the lower priority having no experience that a data to be transmitted associated with the logical connection has been overwritten during the transmission of the data from being abandoned. This results in preventing the refusing to fulfill a request from spreading over all of a plurality of requests each to send a message constructed of a plurality of data to be transmitted, which can be handled by a host application program, by way of each of a plurality of logical connections with the lower priority. The embodiment of the present invention thus offers an advantage of being able to reduce the rate at which messages which can be handled by a host application program are abandoned.

In accordance with another preferred embodiment of the present invention, the method further comprises the step of, when the data to be transmitted associated with the current data transmission request is overwritten over another data to be transmitted associated with the previous data transmission request being processed now, informing the corresponding transmission request source which made the previous data transmission request of the amount of data which has not been sent out included in the other data over which the data to be transmitted associated with the current data transmission request is overwritten. Accordingly, the embodiment of the present invention offers an advantage of being able to ensure data transmission by way of a logical connection with the lower priority by carrying out the data transmission from the not-yet-transmitted part of the data the transmission of which was suspended.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of managing a transmission buffer memory disposed in an asynchronous transfer mode (ATM) terminal connected to an ATM network for transmitting and receiving data by way of the ATM network, comprising the steps of:

dividing said transmission buffer memory into a plurality of memory areas each for temporarily storing data to be transmitted associated with a request for data transmission;

according to information about a plurality of logical connections established between the ATM terminal and other ATM terminals, assigning each of the plurality of memory areas to at least a transmission request source which uses a corresponding one of the plurality of logical connections;

in response to a request for data transmission from a transmission request source, determining if there is sufficient free space for a data to be transmitted to be stored in a corresponding memory area of said transmission buffer memory which is assigned to the transmission request source;

controlling transfer of the data to be transmitted which is associated with the above data transmission request to the corresponding memory area according to a determination result obtained by the determining step; and grouping the plurality of logical connections each of which is used by a corresponding transmission request source when it sends a data to another ATM terminal on the ATM network into a plurality of groups, and wherein said dividing step includes equally dividing said transmission buffer memory into a plurality of memory areas by the number of the plurality of groups obtained in said grouping step, and said assigning step includes assigning the plurality of memory areas to the plurality of groups, respectively.

2. The transmission buffer memory management method according to claim 1, wherein said grouping step includes grouping the plurality of logical connections into a plurality of groups according to their group identification numbers each of which has been added to setting parameters which define each of the plurality of logical connections which is used by a corresponding transmission request source when it sends a data.

3. The transmission buffer memory management method according to claim 1, wherein said grouping step includes giving each of the plurality of logical connections a group identification number according to the traffic class of each of the plurality of logical connections, and grouping the plurality of logical connections into a plurality of groups according to their group identification numbers given.

4. The transmission buffer memory management method according to claim 3, wherein said grouping step includes automatically giving each of the plurality of logical connections a group identification number according to the traffic class of each of the plurality of logical connections, such as constant bit rate (CBR), variable bit rate (VBR), or available bit rate (ABR), and automatically grouping the plurality of logical connections into a plurality of groups according to their group identification numbers given.

5. The transmission buffer memory management method according to claim 4, wherein said grouping step includes giving a plurality of logical connections with the traffic class of ABR an identical group identification number and therefore grouping the plurality of logical connections into one group, and assigning priorities to the plurality of logical connections which belong to the same group, and wherein the group management table includes information showing a correspondence of the plurality of logical connections, the identical group identification number, and the priorities.

6. The transmission buffer memory management method according to claim 5, wherein when a request for data transmission via one logical connection with the traffic class of ABR grouped into the same group is made, a data to be transmitted associated with the current data transmission request is transferred to a corresponding memory area which is assigned to the plurality of logical connections included in the same group, in said controlling step, if it is determined, in said determining step, there is sufficient free space for the data to be transmitted to be stored in the corresponding memory area, and wherein when it is determined, in said determining step, there is no sufficient free space for the data to be transmitted to be stored in the corresponding memory area, the priority assigned to the logical connection which is to be used by the above data transmission request is compared with the priority assigned to another logical connection which is being used by a previous data transmission request being processed now and the data to be transmitted associated with the above current data transmission request is then transferred to the corresponding memory area and is overwritten over another data to be transmitted associated with the previous data transmission request being processed now if the priority assigned to the logical connection associated with the current transmission request is higher than that assigned to the other logical connection associated with the previous transmission request being processed now, and the current data transmission request is refused and another request for data transmission is waited for if the priority assigned to the logical connection associated with the current data transmission request is lower than or equal to that assigned to the other logical connection associated with the previous data transmission request being processed now.

7. An ATM communication device disposed in an ATM terminal, comprising:
   a plurality of data transmission request means each for establishing a logical connection between said ATM terminal and another ATM terminal on an ATM network, and for sending a data by way of the logical connection;
   a buffer memory for temporarily storing a data to be transmitted from each of said plurality of data transmission request means;
   a data transmission means for segmenting a data to be transmitted from said transmission buffer memory into a plurality of fixed-length cells and for sending out the plurality of cells on the ATM network cell by cell;
   a connection management means for managing and providing management information about a plurality of logical connections each of which is to be used by a corresponding one of said plurality of data transmission request means when it sends a data by way of each of the plurality of logical connections; and
   a buffer memory management means for dividing said transmission buffer memory into a plurality of memory areas, and for assigning each of the plurality of memory areas to at least one of said plurality of data transmission request means, said transmission buffer memory management means releasing each of the plurality of memory areas of said transmission buffer memory assigned to at least one of said plurality of data transmission request means at the completion of transmission of a data from said one data transmission request means by said data transmission means,
   wherein said buffer memory management means groups the plurality of logical connections each of which is used by a corresponding one of said plurality of data transmission request means when it sends a data to another ATM terminal on the ATM network into a plurality of groups, and then equally divides said transmission buffer memory into a plurality of memory areas by the number of the plurality of groups and further assigns the plurality of memory areas to the plurality of groups, respectively.

8. The ATM communication device according to claim 7, wherein said buffer memory management means groups the plurality of logical connections into a plurality of groups according to their group identification numbers each of which has been added to setting parameters which define each of the plurality of logical connections which is used by a corresponding one of said plurality of data transmission request means when it sends a data to another ATM terminal on the ATM network, and then generates a group management table including information about the grouping of the plurality of logical connections.

9. The ATM communication device according to claim 7, wherein said buffer memory management means gives each of the plurality of logical connections a group identification number according to traffic class of each of the plurality of logical connections, and wherein said buffer memory management means groups the plurality of logical connections into a plurality of groups according to their group identification numbers given and then generates a group management table including information about the grouping of the plurality of logical connections.

10. The ATM communication device according to claim 9, wherein said buffer memory management means gives each of the plurality of logical connections a group identification number according to the traffic class of each of the plurality of logical connections, such as constant bit rate (CBR), variable bit rate (VBR), or available bit rate (ABR), and then automatically groups the plurality of logical connections according to their group identification numbers given.

11. The ATM communication device according to claim 10, wherein said buffer memory management means gives a plurality of logical connections with the traffic class of ABR an identical group identification number, and said buffer memory management means then groups the plurality of logical connections with the same group identification number into one group and assigns priorities to the plurality of logical connections which belong to the same group, and wherein the group management table includes information showing a correspondence of the plurality of logical connections with the same group identification number, the group identification number, and the priorities.

12. The ATM communication device according to claim 11, wherein when said buffer memory management means receives a request for data transmission via one logical connection with the traffic class of ABR grouped into the same group, said buffer memory management means transfers a data to be transmitted associated with the data transmission request to a corresponding memory area which is assigned to the logical connection which belongs to the same group if there is sufficient free space for the data to be transmitted to be stored in the corresponding memory area, and wherein unless there is sufficient free space for the data to be transmitted to be stored in the corresponding memory area, said buffer memory management means compares the priority assigned to the logical connection which is to be used by the above current data transmission request with the priority assigned to another logical connection which is being used by a previous data transmission request being processed now and then transfers the data to be transmitted associated with the above current transmission request to the corresponding memory area and overwrites the data to be transmitted on another data to be transmitted associated with the previous data transmission request being processed now if the priority assigned to the logical connection associated with the current transmission request is higher than that assigned to the other logical connection associated with the previous transmission request being processed now, or said buffer memory management means refuses the current data transmission request and waits for another request for data transmission if the priority assigned to the logical connection associated with the current transmission request is lower than or equal to that assigned to the other logical connection associated with the previous transmission request being processed now.

13. An ATM communication device, comprising:
a plurality of data transmission request means each for establishing one of a plurality of logical connections to an ATM network to send data;
a buffer memory for temporarily storing said data from said data transmission request means;
a data transmission means for sending said data stored in said buffer memory to said ATM network;
a buffer memory management means for obtaining a number based on a parameter of said logical connections established by said transmission request means, and dividing said buffer memory into a plurality of memory areas in accordance with said number, and assigning each of said memory areas to at least one of said data transmission request means,
wherein said buffer memory management means groups said logical connections into a plurality of groups based on said parameter, and obtains the number of said groups as said number, and assigns each of said memory areas to at least one of said data transmission request means according to said groups.

14. The ATM communication device according to claim 13, wherein said parameter includes a plurality of group identifications corresponding to said data transmission request means.

15. The ATM communication device according to claim 13, wherein said parameter includes a plurality of traffic classes of said logical connections, and said buffer memory management means groups said data transmission request means according to said traffic classes.

16. The ATM communication device according to claim 15, wherein said traffic classes include the classes of constant bit rate (CBR), variable bit rate (VBR), and available bit rate (ABR).

17. The ATM communication device according to claim 16, wherein said buffer memory management means groups at least two of said logical connections whose traffic class is ABR into an identical group which is one of said groups, and outputs data related to said identical group from said two of data transmission request means to one of said memory areas corresponding to said identical group.

18. The ATM communication device according to claim 13, wherein said logical connection includes a first logical connection transmitting first data and a second logical connection transmitting second data, and one of said memory areas is a common memory area assigned to said first and second logical connections which belong to said identical group, and said buffer memory management means comprises,
overwriting means for overwriting said first data existing in said common memory area with said second data when a priority of said second logical connection is higher than a priority of said first logical connection; and,
refusing means for refusing said second data when a priority of said second logical connection is lower than a priority of said first logical connection.

* * * * *